United States Patent
Bolton

(10) Patent No.: US 10,624,318 B2
(45) Date of Patent: Apr. 21, 2020

(54) ERGONOMIC PROTECTIVE CONE COLLAR FOR PETS

(71) Applicant: Carl William Bolton, Santa Barbara, CA (US)

(72) Inventor: Carl William Bolton, Santa Barbara, CA (US)

(*) Notice: Subject to any disclaimer, the term of this patent is extended or adjusted under 35 U.S.C. 154(b) by 0 days.

(21) Appl. No.: 16/238,461

(22) Filed: Jan. 2, 2019

(65) Prior Publication Data
US 2020/0008399 A1    Jan. 9, 2020

Related U.S. Application Data

(63) Continuation-in-part of application No. 29/658,280, filed on Jul. 30, 2018, now Pat. No. Des. 869,103, and
(Continued)

(51) Int. Cl.
*A01K 13/00* (2006.01)
*A01K 15/04* (2006.01)
(Continued)

(52) U.S. Cl.
CPC ............ *A01K 15/04* (2013.01); *A01K 27/001* (2013.01); *A61D 9/00* (2013.01)

(58) Field of Classification Search
CPC .... A01K 15/006; A01K 15/04; A01K 13/006; A01K 27/001; A61D 9/00
(Continued)

(56) References Cited

U.S. PATENT DOCUMENTS 2,111,844 A    3/1938    Davidson
D111,496 S     9/1938    Marks
(Continued)

FOREIGN PATENT DOCUMENTS

DE    19629581 A1 *   1/1998   ........... A01K 13/006
FR    2823641 A1 *    10/2002  ........... A01K 13/006

OTHER PUBLICATIONS https://www.amazon.com/Alfie-Pet-Petoga-Couture-Recovery/dp/B01C2LU5M2?imprToken=NNyZPAvVf3Cv8TxC0Lhdjg&slotNum=9&psc=1&SubscriptionId=AKIAIQDS7QDCI3VDTUOQ&tag=k9ofmine-20&linkCode=xm2&camp=2025&creative=165953&creativeASIN=B01C2LU5M2 (Year: 2017).*
(Continued)

*Primary Examiner* — Peter M Poon
*Assistant Examiner* — Danielle A Clerkley
(74) *Attorney, Agent, or Firm* — Eric Kelly

(57) ABSTRACT

Ergonomic protective cone collars for pets, their use, and positioning are disclosed. Such cone-collars may be made of two main sections, a cone-like-structure and an integral-collar that may be attached to a base of the cone-like-structure. The integral-collar may be collar like, intended to be worn and fastened around a neck of the animal. The cone-like-structure may be made from a plurality of radially-oriented-tapered-pockets, that due to their fill and/or material of construction may be semi-rigid, imparting a degree of inherent stiffness, flexibility, and/or elasticity. The plurality of radially-oriented-tapered-pockets may be of different lengths such that the cone-like-structure has an overall scalloped shape which may provide for several benefits, such as proper coverage proximate to the animal's mouth region and less visually obscuring material at the sides of the animal's head. A cone-collar may be positioned properly on the animal via removable attachment to a harness worn by the animal.

17 Claims, 18 Drawing Sheets

Related U.S. Application Data a continuation-in-part of application No. 29/655,869, filed on Jul. 9, 2018, now abandoned.

(60) Provisional application No. 62/721,728, filed on Aug. 23, 2018.

(51) Int. Cl.
  *A61D 9/00* (2006.01)
  *A01K 27/00* (2006.01)

(58) Field of Classification Search
  USPC ....... 119/762, 814, 815, 850, 855, 856, 858, 119/816, 821; D30/145, 152; 2/468; 602/18
  See application file for complete search history.

(56) References Cited

U.S. PATENT DOCUMENTS

| | | | |
|---|---|---|---|
| D121,538 S | 7/1940 | Bressler | |
| D132,981 S | 7/1942 | Solash | |
| D133,564 S | 8/1942 | Horowitz | |
| D157,252 S | 2/1950 | Goldberg | |
| 3,013,530 A | 12/1961 | Zeman | |
| 3,036,554 A | 5/1962 | Johnson | |
| 3,343,774 A | 9/1967 | Pryor | |
| D208,901 S | 10/1967 | Urben | |
| 4,200,057 A | 4/1980 | Agar | |
| 4,476,814 A | 10/1984 | Miller | |
| D296,496 S | 7/1988 | Kang | |
| 5,275,581 A * | 1/1994 | Bender | A61F 5/055 128/DIG. 23 |
| D347,694 S | 6/1994 | Forgas | |
| 5,628,283 A * | 5/1997 | Huegelmeyer | A01K 13/006 119/815 |
| D382,800 S | 8/1997 | Dedering | |
| 6,044,802 A | 4/2000 | Schmid | |
| 6,058,517 A * | 5/2000 | Hartunian | A41D 13/0512 2/468 |
| D436,929 S | 1/2001 | Kane | |
| 6,244,222 B1 | 6/2001 | Bowen | |
| 6,283,126 B1 | 9/2001 | Jessen | |
| 6,532,904 B1 | 3/2003 | Bowen | |
| D475,817 S | 6/2003 | Heyek | |
| D506,296 S | 6/2005 | Driver | |
| D562,505 S | 2/2008 | Fugita | |
| D592,363 S | 5/2009 | Price | |
| 7,617,800 B2 | 11/2009 | Trescott | |
| 7,765,957 B2 | 8/2010 | Behravesh | |
| D631,210 S * | 1/2011 | Hurst | D30/144 |
| D632,851 S | 2/2011 | Maroney | |
| D643,160 S | 8/2011 | Welles | |
| D647,669 S | 10/2011 | Martinez | |
| 8,042,494 B2 | 10/2011 | Markfield | |
| 8,061,306 B2 | 11/2011 | Schwarz | |
| D656,812 S | 4/2012 | Bucci | |
| 8,181,609 B2 | 5/2012 | Ohashi | |
| D664,721 S | 7/2012 | Martinez | |
| 8,286,593 B2 | 10/2012 | Albers | |
| D673,739 S | 1/2013 | Herrera | |
| D705,502 S | 5/2014 | Markfield | |
| 8,720,386 B2 | 5/2014 | Markfield | |
| D711,050 S | 8/2014 | Ebrahimi | |
| 8,881,687 B2 | 11/2014 | Colangelo | |
| D734,899 S | 7/2015 | Martinez | |
| 9,204,620 B2 | 12/2015 | Hamilton | |
| D757,372 S | 5/2016 | Clinton | |
| 9,427,288 B1 | 8/2016 | Chenger | |
| 9,585,365 B1 * | 3/2017 | Gibson | A01K 13/006 |
| D785,805 S | 5/2017 | Geers | |
| 9,642,337 B2 | 5/2017 | Lippincott | |
| D850,223 S | 6/2019 | Leibman | |
| 2005/0283103 A1 | 12/2005 | Murfett | |
| 2009/0090307 A1 | 4/2009 | Heister | |
| 2009/0107419 A1 | 4/2009 | Davis | |
| 2009/0241855 A1 | 10/2009 | Stocki | |
| 2010/0024743 A1 | 2/2010 | Wang | |
| 2010/0024745 A1 * | 2/2010 | Harlow | A01K 13/006 119/856 |
| 2011/0139091 A1 * | 6/2011 | Ohashi | A01K 13/006 119/821 |
| 2012/0145093 A1 * | 6/2012 | Martinez | A01K 27/009 119/863 |
| 2012/0174877 A1 | 7/2012 | Thompson | |
| 2012/0325163 A1 | 12/2012 | Markfield | |
| 2013/0055968 A1 | 3/2013 | Lippicott | |
| 2013/0074784 A1 | 3/2013 | Briggs | |
| 2014/0096722 A1 * | 4/2014 | Groff | A01K 13/006 119/815 |
| 2015/0053147 A1 | 2/2015 | Lippincott | |
| 2016/0000040 A1 | 1/2016 | Markfield | |
| 2017/0099808 A1 * | 4/2017 | Garfinkel | A01K 13/006 |
| 2017/0280681 A1 * | 10/2017 | Jurgens | A01K 13/006 |
| 2018/0077901 A1 | 3/2018 | Hallquist | |

OTHER PUBLICATIONS

5. Kong Cloud Collar found at https://www.chewy.com/kong-cloud-collar-dogs-cats-x-small/dp/47471?utm_source=google-product&utm_medium=cpc&utm_campaign=hg&utm_content=KONG&utm_term=&gclid=EAlaIQobChMIjMCxpvu_3AIVAcRkCh1oLQMKEAQYASABEgKYG_D_BwE (last visited on Jul. 27, 2018) (found from Google image searching for "dog cone collars"); see concurrently filed NPL record.
6. Comfy Cone E-Collar found at https://www.chewy.com/comfy-cone-e-collar-dogs-cats-tan/dp/134266?utm_source=google-product&utm_medium=cpc&utm_campaign=hg&utm_content=All%20Four%20Paws&utm_term=&gclid=EAlaIQobChMIjMCxpvu_3AIVAcRkCh1oLQMKEAQYAiABEgKIsfD_BwE (last visited on Jul. 27, 2018) (found from Google image searching for "dog cone collars"); see concurrently filed NPL record.
1. Dog E-collar found at https://madison.com/lifestyles/pets/alternatives-to-your-dogs-cone-of-shame/article_1aad6b96-4cb2-54a8-8eda-9568fc68e08b.html (last visited on Jul. 27, 2018) (found from Google image searching for "dog cone collars"); see concurrently filed non-patent literature record (hereinafter, "NPL").
2. Dog E-collar found at https://iheartdogs.com/ask-a-vet-why-do-we-hate-the-cone-of-shame/ (last visited on Jul. 27, 2018) (found from Google image searching for "dog cone collars"); see concurrently filed NPL record.
3. Dog E-collar found at https://pawsplaza.wordpress.com/2016/07/26/alternatives-to-the-classic-cone-of-shame/ (last visited on Jul. 27, 2018) (found from Google image searching for "dog cone collars"); see concurrently filed NPL record.
4. Alfie Pet Noah Lion found at https://www.chewy.com/alfie-pet-noah-lion-dog-cat-recovery/dp/137450?utm_source=google-product&utm_medium=cpc&utm_campaign=hg&utm_content=Alfie%20Pet&utm_term=&gclid=EAlaIQobChMIjMCxpvu_3AIVAcRkCh1oLQMKEAQYAyABEgLR5vD_BwE (last visited on Jul. 27, 2018) (found from Google image searching for "dog cone collars"); see concurrently filed NPL record.
5. Kong Cloud Collar found at https://www.chewy.com/kong-cloud-collar-dogs-cats-x-small/dp/47471?utm_source=google-product&utm_medium=cpc&utm_campaign=hg&utm_content=KONG&utm_term=&gclid=EAlaIQobChMIjMCxpvu_3AIVAcRkCh1oLQMKEAQYASABEgKYG_D_BwE (last visited on Jul. 27, 2018) (found from Google image searching for "dog cone collars"); see concurrently filed NPL record.
6. Comfy Cone E-Collar found at https://www.chewy.com/comfy-cone-e-collar-dogs-cats-tan/dp/134266?utm_source=google-product&utm_medium=cpc&utm_campaign=hg&utm_content=All%20Four%20Paws&utm_term=&gclid=EAlaIQobChMIjMCxpvu_3AIVAcRkCh1oLQMKEAQYAiABEgKIsfD_BwE (last visited on Jul. 27, 2018) (found from Google image searching for "dog cone collars"); see concurrently filed NPL record.
9. E-Collar found at https://www.walmart.com/ip/E-Collar-XS-8ln-Clr/530882635?wmlspartner=wlpa&selectedSellerId=1148&adid=

(56) References Cited

OTHER PUBLICATIONS

22222222227158018840&wl0=&wl1=s&wl2=c&wl3=268079565072&wl4=pla-444830528610&wl5=9030985&wl6=&wl7=&wl8=&wl9=pla&wl10=112562587&wl11=online&wl12=530882635&wl13=&veh=sem (last visited on Jul. 27, 2018) (found from Google image searching for "dog cone collars"); see concurrently filed NPL record.
10. Alfie Pet Soft Recovery Collar found at https://www.chewy.com/alfie-pet-soft-recovery-dog-cat/dp/152610?utm_source=google-product&utm_medium=cpc&utm_campaign=hg&utm_content=Alfie%20Pet&utm_term=&gclid=EAIaIQobChMIjMCxpvu_3AIVAcRkCh1oLQMKEAQYByABEgl87vD_BwE (last visited on Jul. 27, 2018) (found from Google image searching for "dog cone collars"); see concurrently filed NPL record.
Dog E-Collar found at http://www.mvtimes.com/2017/10/11/visiting-vet-elizabethan-collars/ (last visited on Jul. 27, 2018) (found from Google image searching for "dog cone collars"); see concurrently filed NPL record.
Inflatable dog E-collar found from Google image searching for "dog cone collars" on Jul. 27, 2018; see concurrently filed NPL record.
Delifur Dog Cone Collar found at https://www.amazon.co.uk/DELIFUR-Collar-Elizabethan-Recovery-Breathable/dp/B072BK61N6 (last visited on Jul. 27, 2018) (found from Google image searching for "dog cone collars"); see concurrently filed NPL record.
Kong EZ Soft Collar found at https://thewirecutter.com/reviews/best-dog-and-cat-cones/ (last visited on Jul. 27, 2018) (found from Google image searching for "dog cone collars"); see concurrently filed NPL record.
Dog E-Collar found at https://www.whole-dog-journal.com/issues/13_8/features/Best-Dog-Cones_20037-1.html (last visited on Jul. 27, 2018) (found from Google image searching for "dog cone collars"); see concurrently filed NPL record.
Dog E-Collar found at http://www.courtyardsatpinecreek.com/voberry-r-recovery-pet-cone-e-collar-for-dogs-and-cats-comfortabe-elizabethan-collar-made-from-water-resistant-nylon-fabric-and-soft-hollow-epe-foam-b01j3cl8w4.html (last visited on Jul. 27, 2018) (found from Google image searching for "dog cone collars"); see concurrently filed NPL record.
KVP Bite Free Collar found at https://www.amazon.com/KVP-Bite-Collar-21-25-Width/dp/B006RQU62S/ref=asc_df_B006RQU62S/?tag=hyprod-20&linkCode=df0&hvadid=198060275213&hvpos=1o1&hvnetw=g&hvrand=3046570793026240185&hvpone=&hvptwo=&hvqmt=&hvdev=c&hvdvcmdl=&hvlocint=&hvlocphy=9030985&hvtargid=pla-355937921758&psc=1 (last visited on Jul. 27, 2018); see concurrently filed NPL record.
Suitical Recovery Suit found at https://www.chewy.com/suitical-recovery-suit-dogs-black/dp/140873? utm_source=google-product&utm_medium=cpc&utm_campaign=hg&utm_content=Suitical&utm_term=&gclid=EAIaIQobChMI4M-exbPA3AIVh8hkCh1VyQgKEAQYASABEgJfvPD_BwE (last visited on Jul. 27, 2018); see concurrently filed NPL record.
"Postoperative Halskrause fur Hunde und Katzen." Found online Sep. 23, 2019 at www.amazon.de. Product first available Mar. 13, 2018. Retrieved from URL: https://www.amazon.de/Collerette-postoperativ-postoperative-Operationen-Kanichenn/dp/B00O4AVJCK (Year: 2018). This NPL was cited in a Notice of Allowance correspondence in U.S. Appl. No. 29/658,280 dated Oct. 3, 2019.

"Gulunmun Halskrausen Blumen-Muster-Haustier-Katzen-Hunde." Found online Sep. 23, 2019 at www.amazon.de. Product first available Apr. 20, 2019. Retrieved from URL: https://www.amazon.de/Halskrausen-Blumenmuster-Haustier-Schutzh%C3%BCIle-Halsumfang/dp/B07R1M7GZT (Year: 2019). This NPL was cited in a Notice of Allowance correspondence in U.S. Appl. No. 29/658,280 dated Oct. 3, 2019.
"Creation Core Protective Collar for Cats and Dogs." Found online Sep. 23, 2019 at www.amazon.com. Product reviewed Jul. 10, 2019. Retrieved from URL: https://www.amazon.com/Creation-Core-Protective-Recovery-Anti-Bite/dp/B07KF1YZHC (Year: 2019). This NPL was cited in a Notice of Allowance correspondence in U.S. Appl. No. 29/658,280 dated Oct. 3, 2019.
"PACASSO New Soft Inflatable Recovery Collar for Dogs." Found online Sep. 23, 2019 at www.amazon.com. Product reviewed Aug. 6, 2018. Retrieved from URL: https://www.amazon.com/PACASSO-Inflatable-circumference-Adjustable-Protective/dp/B07FD34DQB?_encoding=UTF8&psc=1 (Year: 2018). This NPL was cited in a Notice of Allowance correspondence in U.S. Appl. No. 29/658,280 dated Oct. 3, 2019.
https://www.petco.com/shop/en/petcostore/product/well-and-good-padded-e-collar-x-small-575-95-2404447?&utm source=google&utm medium=cpc&adpos=lo4&scid=scplp2404447&sc intid=2404447&cm mmc=PLA-GG- -PTC P SUP PLA-GG FY17 SCShopping-Desktop- -Non-i-VIP-Desktop- -58700003272135490&utm source=google&utm medium=cpc&adpos=%7badpos%7d&scid=scplp2404447&sc intid=2404447&kwid=p30078735047&device=c&gclid=EAlaIOobChMIiMCxpvu 3AIVAcRkChIoLOMKEAOYBCABEgK-ZPD BwE&gclsrc=aw.ds#.
https://www.google.com/shopping/product/55684578223767873?lsf=seller:8064,store:2510803220072555121&prds=oid:4488871417372986382&q=dog+cone+collars&hl=en&ei=e2tbW7zHFsmE0wKQ85vYCw&Isft=utm source:google.utm term:5269082.utm medium:cpc.utm content:GSC+—i-Medium+-t-Hardgoods+-+Dog+%7C+*Catch+All.utm campaign:GSC+—i-Medium+-i-Hardgoods+-t-Dog+-+LIA+Qnly&utm medium=cpc&Isft=gclid:EAlaIQobChMIiMCxpvu 3AIVAcRkChIoLQMKEAOYBSABEgJuJfD BwE.
https://www.petco.com/shop/en/petcostore/product/contech-procone-soft-recovery-collar-1558315?&utm source=google&utm medium=cpc&adpos=lolO&scid=scplpl558315&sc intid=1558315&cm mmc=PLA-GG- -PTC P SUP PLA-GG FY17 SCShopping-Desktop- -Non-i-VIP-Desktop- -58700003272135490&utm source=google&utm medium=cpc&adpos=%7badpos%7d&scid=scplp!558315&scintid=1558315&kwid=p30078735047&device=c&gclid=EAlaIOobChMIiMCxpvu 3AIVAcRkCh 1 oLOMKEAOYCiABEgKQoPD BwE&gclsrc=aw.ds.
https://www.google.com/shopping/product/55684578223767873?lsf=seller:8064,store:2510803220072555121&prds=oid:4488871417372986382&q=dog+cone+collars&hl=en&ei=e2tbW7zHFsmE0wKQ85vYCw&Isft=utm source:google.utm term:5269082.utm medium:cpc.utm content:GSC+—i-Medium+-t-Hardgoods+-+Dog+%7C+*Catch+All.utm campaign:GSC+—i-Medium+-i-Hardgoods+-t-Dog+-+LIA+Qnly&utm medium=cpc&Isft=gclid:WAlaIQoBChMIiMCxpvu 3AIVAcRkChIoLQMKEAOYBSABEgJuJfD BwE.

* cited by examiner

ERGONOMIC PROTECTIVE CONE COLLAR FOR PETS

PRIORITY NOTICE

The present application claims priority under 35 U.S.C. § 119(e) to U.S. Provisional Patent Application Ser. No. 62/721,728 filed on Aug. 23, 2018, the disclosure of which is incorporated herein by reference in its entirety.

The present patent application is a continuation-in-part (CIP) of U.S. non-provisional patent application Ser. No. 29/655,869 filed on Jul. 9, 2018; wherein this present patent application claims priority to said U.S. non-provisional patent application under 35 U.S.C. § 120. The above-identified parent U.S. non-provisional patent application is incorporated herein by reference in their entirety as if fully set forth below.

The present patent application is a continuation-in-part (CIP) of U.S. non-provisional patent application Ser. No. 29/658,280 filed on Jul. 30, 2018; wherein this present patent application claims priority to said U.S. non-provisional patent application under 35 U.S.C. § 120. The above-identified parent U.S. non-provisional patent application is incorporated herein by reference in their entirety as if fully set forth below.

TECHNICAL FIELD OF THE INVENTION

The present invention relates in general to protective devices that may be worn by an animal to prevent licking and/or biting of an area on that animal, wherein such devices are known in the relevant industry as Elizabethan collars, E-collars, pet cone, cone of shame, and like; and more specifically to ergonomic protective cone collars for pets that may be semi-rigid and scalloped.

COPYRIGHT AND TRADEMARK NOTICE

A portion of the disclosure of this patent application may contain material that is subject to copyright protection. The owner has no objection to the facsimile reproduction by anyone of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is by way of example and should not be construed as descriptive or to limit the scope of this invention to material associated only with such marks.

BACKGROUND OF THE INVENTION

Presently (circa 2018) there are a variety of protective Elizabethan collars (E-collars) available. There are the substantially plastic E-collars, which are cone shaped and may or may not have some degree of transparency. There are the inflatable donut like E-collars. There are the flimsy substantially planar and fabric E-collars, which may be cone shaped or disc shaped. All of these preexisting E-collars have various undesirable problems.

The plastic E-collars are generally too stiff and too rigid, increasing the likelihood of undesired environmental collisions with the too stiff and too rigid plastic E-collars. Additionally, the excessive undesirable stiffness and rigidity make it difficult to impossible for the animal to lay down in a preferred position, such as curling up. Further such plastic E-collars interface with the entire circumference of the neck of the animal and thus loads from collisions are imparted directly and often uncomfortably to the animal's neck. Further still, because such plastic E-collars have a uniform length, this increases the likelihood of undesired environmental collisions. And yet further still, because such plastic E-collars have the uniform length, this blocks and interferes with the animal's peripheral vision, causing unnecessary and undesired stress in the animal. Animals wearing such plastic E-collars show obvious signs of unhappiness and discomfort. Such problems have spawned the common nickname for such plastic E-collars as the "cone of shame."

The flimsy substantially planar and fabric E-collars due to their uniform lengths also suffer from some of the same problems as the plastic E-collars, such as the increased likelihood of undesired environmental collisions; as well as the blockage and interference with peripheral vision of the animal. However, where the plastic E-collars are too stiff and too rigid; the substantially planar and fabric E-collars are too flimsy, i.e., not stiff enough, not rigid enough. Because they are so flimsy, the animal can circumvent the E-collar by bending the flimsy fabric material out of the way.

Some hybrid E-collars are essentially the plastic E-collars covered in a fabric. However, covering the essentially plastic E-collar in a fabric does not solve any of the problems of the typical plastic E-collar; some problems of the plastic E-collars being noted above.

The inflatable E-collars because of their donut shape tend to limit adequate protection and because of that aspect, inflatable E-collars are more suited for animals with short noses, such as, cats and some brachycephalic breeds (e.g., pugs). Further, some inflatable E-collars have relatively large outside diameters that increase the likelihood of undesirable environmental collisions.

The disc like E-collars have relatively large outside diameters that increase the likelihood of undesirable environmental collisions. Many of the disc like E-collars are also flimsy, allowing the animal to bend or shift the material out of the way and be circumvented.

There is also a cone E-collar with windows. This type of E-collar has the same problems as the plastic E-collars. The windows may help with the peripheral vision interference problem somewhat; however, the windows do have problems. For one, this E-collar with windows can rotate about the neck, such that windows can be located in positions which do not help with the peripheral vision problem, i.e., the windows may be rotated such that opaque material is proximate to the sides of the animal's head and thus block and interfere with the animal's peripheral vision. Further, the windows are of flexible substantially transparent plastic, such that even when positioned correctly the window's presence is readily noted by the animal's peripheral vision; and imagery passing through the flexible window may be readily optically distorted.

Existing E-collars may be secured around the animal's neck. Some existing E-collars may be attached to an existing collar or just directly to the animal's neck. Either way, undesirable rotation of the E-collar may occur about (around) the animal's neck. Additionally, without an integral and flat collar (i.e., an elongate flexible member with a given flat width), loads on the cone from undesired collisions may be imparted directly to the neck of the animal causing problems, such as annoyance, discomfort, pain, chafing of the skin, and even injury. It may be desirable to have an integral and flat collar (with a flat width portion) as part of the cone, to better distribute collision loads, which may then increase comfort to the animal. It may be desirable to prevent rotation about (around) the animal's neck of the cone.

Prevention of undesired self-inflicted licking and/or biting may also be sought by way of stiff cervical collars and/or surgical recovery suits. The cervical collars function by being very stiff and rigid, which may be uncomfortable to the animal. The surgical recovery suit may function by covering the incision site(s) with the suit. To minimize the ability of the animal to get out of the suit, such suits are generally tight fitting, as in compression fitting. Such tight fitting suits may make it difficult for skin and fur of the animal to aerate; which in turn may promote build up undesirable microorganisms such as bacteria, yeast, mildew, and/or other fungi; that in turn may cause undesirable odors and/or other undesirable health problems in the animal.

There is a need in the art for a new type of Elizabethan protective pet collar that has just the right amount of stiffness (rigidity), i.e., not too stiff and not too flimsy; that may be scalloped in design to provide sufficient protective material proximate to the animal's mouth, but has less material at the sides of the animal's head to as to minimize interference with the animal's peripheral vision; that has an integral collar (that is part of the cone or attached to the cone that has a flat width portion) to provide comfort, in part by better distributing loads from the protective aspects of the product; and in some embodiments, may be attached to a harness to minimize undesirable rotation.

It is to these ends that the present invention has been developed.

BRIEF SUMMARY OF THE INVENTION

To minimize limitations in the prior art, and to minimize other limitations that will be apparent upon reading and understanding the present specification, the present invention describes ergonomic protective cone collars ("cone-collars") for pets (and animals), their use, and positioning. Such cone-collars may be made of two main sections, a cone-like-structure and an integral-collar that may be attached to a base (e.g., at an inner-lesser-edge) of the cone-like-structure. The integral-collar may be collar like (i.e., elongate, flexible, and with a given flat width), intended to be worn and fastened around a neck of the given animal. The cone-like-structure may be made from a plurality of radially-oriented-tapered-pockets, that due to their fill and/or material of construction may be semi-rigid, imparting a degree of inherent stiffness, flexibility, softness and/or elasticity. The plurality of radially-oriented-tapered-pockets may be of different lengths such that the cone-like-structure has an overall scalloped shape which may provide for several benefits, such as, but not limited to, proper coverage proximate to the animal's mouth region and less visually obscuring material at the sides of the animal's head. In some embodiments, the cone-collar may be positioned properly on the animal via removable attachment to a harness worn by the animal, which may then prevent undesired rotation of the cone-collar. The harness when worn, may be non-rotatable on the animal.

It is an objective of the present invention to provide an ergonomic protective cone collar for pets (animals).

It is another objective of the present invention to provide an ergonomic protective cone collar for pets (animals) that is effective at preventing undesirable self-inflicted licking and/or biting.

It is another objective of the present invention to provide an ergonomic protective cone collar for pets (animals) that is safe.

It is another objective of the present invention to provide an ergonomic protective cone collar for pets (animals) that is comfortable.

It is another objective of the present invention to provide an ergonomic protective cone collar for pets (animals) that may be worn comfortably while the animal is laying down, even in a curled up position.

It is another objective of the present invention to provide an ergonomic protective cone collar for pets (animals) that is superior to existing Elizabethan style cone collars (E-collars).

It is another objective of the present invention to provide an ergonomic protective cone collar for pets (animals) that may have proper stiffness/rigidity in the cone portion of the cone-like-structure, that is not too stiff (where too stiff/too rigid provides for undesirable environmental impacts and making laying down difficult) and that is not too flimsy (such that it could be easily circumvented).

It is another objective of the present invention to provide an ergonomic protective cone collar for pets (animals) that may have a cone-like-structure that is semi-rigid, with some elasticity, such that there is sufficient stiffness/rigidity that the animal cannot or may not easily circumvent the cone-line-structure; but with sufficient elasticity to absorb at least portions of impacts with the environment and/or to temporarily partially deform from impacts with the environment, but that returns substantially to an original shape when the environmental collision may be over.

It is another objective of the present invention to provide an ergonomic protective cone collar (cone-collar) for pets (animals) that may be structured with less material proximate to sides of the animal's head when the cone-collar may be worn properly, so as to minimize blockage and/or interference with the animal's peripheral vision.

It is another objective of the present invention to provide an ergonomic protective cone collar for pets (animals) that may be structured with less material proximate to sides of the animal's head but with sufficient material proximate to the animal's mouth (snout) when the cone-collar may be worn properly, so as to minimize blockage and/or interference with the animal's peripheral vision and to maximize prevention of self-inflicted licking and/or biting.

It is another objective of the present invention to provide an ergonomic protective cone collar (cone-collar) for pets (animals) that may be structured with a cone-like-structure that is of different lengths, such that this cone-like-structure may be scalloped in its overall shape.

It is another objective of the present invention to provide an ergonomic protective cone collar (cone-collar) for pets (animals) that may be structured with a cone-like-structure that is of different lengths, such that this cone-like-structure may be scalloped; so as to provide less material of the cone-like-structure proximate to sides of the animal's head but with sufficient material of the cone-like-structure proximate to the animal's mouth (snout) when the cone-collar may be worn properly, so as to minimize blockage and/or interference with the animal's peripheral vision and to maximize prevention of self-inflicted licking and/or biting.

It is another objective of the present invention to provide an ergonomic protective cone collar (cone-collar) for pets (animals) that may have an integral collar.

It is another objective of the present invention to provide an ergonomic protective cone collar (cone-collar) for pets (animals) that may have an integral collar whose portions that contact the animal may be substantially flat, for better impact load distribution and better comfort.

It is another objective of the present invention to provide an ergonomic protective cone collar (cone-collar) for pets (animals) that is superior to existing Elizabethan style cone collars (E-collars) by being more comfortable by being able to better distribute impact loads around an integral collar of the cone-collar.

It is another objective of the present invention to provide an ergonomic protective cone collar (cone-collar) for pets (animals) that may be removably anchored and substantially positionally fixed to prevent undesirable rotation about the animal's neck.

It is another objective of the present invention to provide a system of a harness and an ergonomic protective cone collar (cone-collar) for pets (animals) that may be removably attached to the harness; wherein this may minimize undesired rotation and/or make unintended removable of the cone-collar by the animal less likely.

It is another objective of the present invention to provide an ergonomic protective cone collar (cone-collar) for pets (animals) that when worn may still allow the animal to eat and/or drink relatively normally.

It is yet another objective of the present invention to provide an ergonomic protective cone collar (cone-collar) for pets (animals) that may be light weight, in part due to its scalloped shape; wherein less weight makes the cone-collar more ergonomic, more comfortable, more affordable to manufacture, and/or more affordable to ship.

These and other advantages and features of the present invention are described herein with specificity so as to make the present invention understandable to one of ordinary skill in the art, both with respect to how to practice the present invention and how to make the present invention.

BRIEF DESCRIPTION OF THE SEVERAL VIEWS OF THE DRAWINGS

Elements in the figures have not necessarily been drawn to scale in order to enhance their clarity and improve understanding of these various elements and embodiments of the invention. Furthermore, elements that are known to be common and well understood to those in the industry are not depicted in order to provide a clear view of the various embodiments of the invention.

Figure 1:
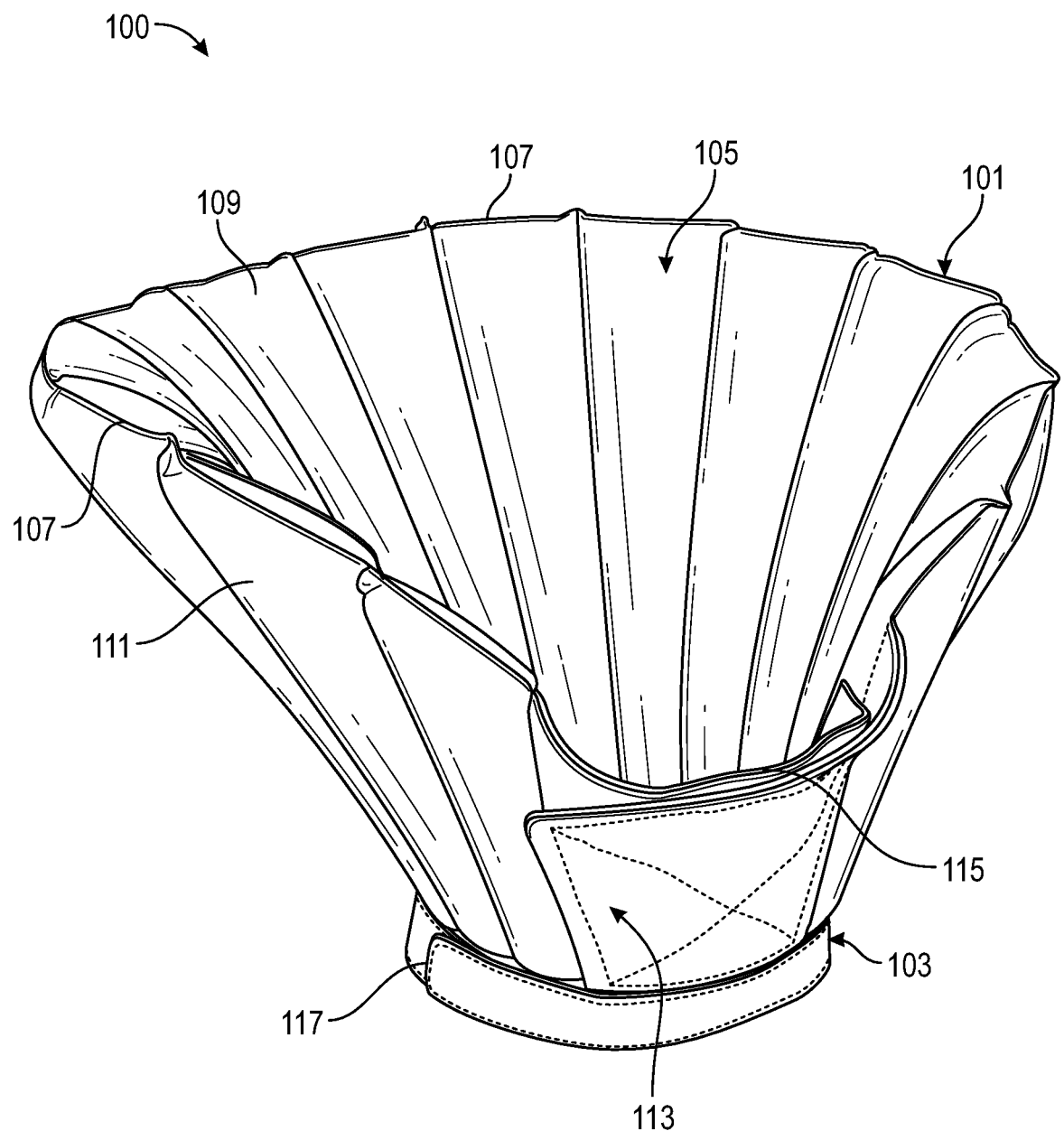
FIG. 1 may show a top left perspective view of an ergonomic protective cone collar for pets (hereinafter, "cone-collar"), according to a first embodiment.

Note the above views may be with respect to the given cone-collar shown in the figure and not with respect to anatomical positions of the given pet (animal), unless otherwise explicitly stated.

REFERENCE NUMERAL SCHEDULE 100 ergonomic protective cone collar 100 for pets (also referred to as cone-collar 100)
101 cone-like-structure 101
103 integral-collar 103
104 flat width 104
105 radially-oriented-tapered-pocket 105
107 outer-greater-edge 107
108 longest-panel 108
109 interior-facing-surface 109
111 exterior-facing-surface 111
113 outer-flap 113
115 inner-flap 115
117 first-terminal-end 117
201 grommet 201
601 smaller diameter 601
603 imaginary central axis 603
901 inner-lesser-edge 901
1215 flap fastener 1215
1217 second-terminal-end 1217
1219 collar-fastener 1219
1221 complimentary-collar-fastener 1221
1301 harness 1301 (or other-collar 1301)
1303 mechanical-fastener 1303
1399 pet (animal) 1399
1500 method of using collar-cone 1500
1501 step of measuring the animal 1501
1503 step of selecting a size 1503
1505 step of selecting a size 1505
1507 step of unfastening fasteners 1507
1509 step of fastening cone-collar 1509
1511 step of attaching harness to the animal 1511
1513 step of attaching cone-collar to harness 1513
1515 step of removing cone-collar 1515

DETAILED DESCRIPTION OF THE INVENTION

In the following discussion that addresses a number of embodiments and applications of the present invention, reference is made to the accompanying drawings that form a part thereof, where depictions are made, by way of illustration, of specific embodiments in which the invention may be practiced. It is to be understood that other embodiments may be utilized and changes may be made without departing from the scope of the invention.

Note, herein, "pet" and "animal" may be used interchangeably.

Note, herein, "panel" and "pocket" may be used interchangeably.

Note, FIG. 1 through FIG. 11 may show an ergonomic protective cone collar 100 for pets (hereinafter, "cone-collar 100"), according to a first embodiment, from various viewing angles, when this cone-collar 100 may be in a closed configuration. In some embodiments, cone-collar 100 may be an ergonomic protective cone-collar 100 to be removably worn around a neck of an animal 1399. In some embodiments, this closed configuration may be a main configuration for use with a given animal 1399. That is, when a given pet (animal) may be wearing this cone-collar 100, the cone-collar 100 may be in this closed configuration. To attach or remove cone-collar 100 from the pet/animal, may require use of an open configuration for cone-collar 100.

In some embodiments, cone-collar 100 may be intended to be used with any vertebrate pet or animal with a neck and appendages, such as, but not limited to, dogs, cats, and the like. In some embodiments, other pets or animals may comprise: domesticated animals, wild animals, horses, donkeys, mules, cows, buffalo, bison, camels, llamas, alpacas, rabbits, rodents, deer (including antelope and/or moose), monkeys, primates, lemurs, monitor lizards, bears, wolfs, wolverines, large cats, otters, weasels, marsupials, aquatic mammals, and/or the like.

FIG. 1 may show a top left perspective view of cone-collar 100. In some embodiments, cone-collar 100 may comprise a cone-like-structure 101 and an integral-collar 103. In some embodiments, cone-like-structure 101 may be attached to integral-collar 103 to form cone-collar 100. In some embodiments, an inner-lesser-edge 901 of cone-like-structure 101 may be attached to integral-collar 103. See e.g., FIG. 9 for inner-lesser-edge 901. Continuing discussing FIG. 1, in some embodiments, cone-like-structure 101 may comprise a plurality of radially-oriented-tapered-pockets 105. In some embodiments, reference to this radial orientation may be with respect to an axis (e.g., imaginary central axis 603 shown in FIG. 6) that may run through a center of integral-collar 103 in the closed configuration. In some embodiments, each radially-oriented-tapered-pocket 105 selected from the plurality of radially-oriented-tapered-pockets 105 may run radially from inner-lesser-edge 901 to an outer-greater-edge 107. That is, in some embodiments, inner-lesser-edge 901 and outer-greater-edge 107 may be oppositely disposed from each other of a given radially-oriented-tapered-pocket 105. In some embodiments, each radially-oriented-tapered-pocket 105 selected from the plurality of radially-oriented-tapered-pockets 105 may comprise an interior-facing-surface 109 and disposed opposite an exterior-facing-surface 111. For example, and without limiting the scope of the present invention, when cone-collar 100 may be removably worn by a given pet, interior-facing-surface 109 may face a portion of that pet, while exterior-facing-surface 111 may face away from that pet.

Continuing discussing FIG. 1, in some embodiments, interior-facing-surface 109 and/or exterior-facing-surface 111 may be substantially constructed from a fabric (artificial and/or natural). In some embodiments, interior-facing-surface 109 and/or exterior-facing-surface 111 may be substantially windproof or coated with a substantially windproof material. In some embodiments, interior-facing-surface 109 and/or exterior-facing-surface 111 may be substantially waterproof or coated with a substantially waterproof material. In some embodiments, interior-facing-surface 109 and/or exterior-facing-surface 111 may be substantially safe to machine wash. In some embodiments, interior-facing-surface 109 and/or exterior-facing-surface 111 may be substantially soft. In some embodiments, interior-facing-surface 109 and/or exterior-facing-surface 111 may be substantially smooth and/or with minimal porosity and/or with minimal roughness, to facilitate being wiped clean.

Continuing discussing FIG. 1, in some embodiments, each radially-oriented-tapered-pocket 105 selected from the plurality of radially-oriented-tapered-pockets 105 may be formed from stitching (or the like, e.g., a weld line) running around a perimeter of the given radially-oriented-tapered-pocket 105; wherein this stitching (or the like, e.g., a weld line) may separate the interior-facing-surface 109 side from the exterior-facing-surface 111 side. In some embodiments, in at least one such radially-oriented-tapered-pocket 105 selected from the plurality of radially-oriented-tapered-pockets 105 may be a fill (or filler). In some embodiments, this fill may be selected from one or more of: stuffing; batting; polyester (or the like) fiber fill; fibers; strips; foam; expandable liquid foam; air (e.g., air in an air bladder); gas (e.g., gas in a gas bladder); beads; flexible compressible beads; sand; and/or the like. In some embodiments, this fill may provide some rigidity, but not too much rigidity, to the given radially-oriented-tapered-pocket 105. In some embodiments, this fill may provide some rigidity, but not too much rigidity, to cone-like-structure 101. In some embodiments, such fill may provide some elasticity to cone-like-structure 101. In some embodiments, this fill may be substantially safe to machine wash.

In some embodiments, cone-like-structure 101 may be without any rigid to substantially rigid members.

Continuing discussing FIG. 1, in some embodiments, each radially-oriented-tapered-pocket 105 selected from the plurality of radially-oriented-tapered-pockets 105 may be closed (sealed), such that fill may not be accessible. In some embodiments, each radially-oriented-tapered-pocket 105 selected from the plurality of radially-oriented-tapered-pockets 105 may be openable, such that fill may be accessible for replacing, cleaning, changing, etc.

Continuing discussing FIG. 1, in some embodiments, the plurality of radially-oriented-tapered-pockets 105 may be arranged substantially side by side with each other, except at two opposing ends of cone-like-structure 101 which may terminate at two complimentary flaps, outer-flap 113 and inner-flap 115, respectively. In some embodiments, each radially-oriented-tapered-pocket 105 selected from the plurality of radially-oriented-tapered-pockets 105 may be arranged side by side with other radially-oriented-tapered-pockets 105 selected from the plurality of radially-oriented-tapered-pockets 105; except at the terminal ends of cone-like-structure 101. In some embodiments, outer-flap 113 may be next to (adjacent) a radially-oriented-tapered-pocket 105 selected from the plurality of radially-oriented-tapered-pockets 105; and inner-flap 115 may be adjacent (next to) another radially-oriented-tapered-pocket 105 selected from the plurality of radially-oriented-tapered-pockets 105. In some embodiments, outer-flap 113 may be attached to (permanently in some embodiments) a radially-oriented-tapered-pocket 105 selected from the plurality of radially-oriented-tapered-pockets 105; and inner-flap 115 may be attached to (permanently in some embodiments) another radially-oriented-tapered-pocket 105 selected from the plurality of radially-oriented-tapered-pockets 105.

Continuing discussing FIG. 1, in some embodiments, a length of each radially-oriented-tapered-pocket 105 selected from the plurality of radially-oriented-tapered-pockets 105 may be fixed. In some embodiments, this length of each radially-oriented-tapered-pocket 105 may be with respect to a direction running in the radial direction from inner-lesser-edge 901 to outer-greater-edge 107. In some embodiments, the direction of such lengths may also be applied to outer-flap 113 and to inner-flap 115. In some embodiments, the lengths of outer-flap 113 and inner-flap 115 may be fixed. In some embodiments, the length of one given radially-oriented-tapered-pocket 105 may be different from the length of another radially-oriented-tapered-pocket 105. In some embodiments, a shortest length of cone-like-structure 101 may be the lengths of outer-flap 113 and/or inner-flap 115. In some embodiments, a longest length of cone-like-structure 101 may the length of the radially-oriented-tapered-pocket 105 that may be substantially opposite of outer-flap 113 and/or inner-flap 115, when cone-collar 100 may be in the closed configuration. In some embodiments, the lengths of the other radially-oriented-tapered-pockets 105, from the given flap (e.g., outer-flap 113 or inner-flap 115) to the longest length radially-oriented-tapered-pocket 105, may progressively increase in length. Thus, the diameter at outer-greater-edge 107 may be substantially scalloped.

In some embodiments, the plurality of pockets 105 may be a plurality of connected panels 105. In some embodiments, cone-like-structure 101 may be formed from a plurality of connected panels 105 that may be disposed between two flaps, an outer-flap 113 and an inner-flap 115, respectively. In some embodiments, outer-flap 113 and inner-flap 115 are removably attachable to each other; wherein when the two flaps (113 and 115) are removably attached to each other, then cone-like-structure 101 may be in the closed configuration. In some embodiments, the plurality of connected panels 105 proximate to outer-greater-edge 107 may be tapered.

In some embodiments, each pocket 105 may be substantially filled with a filler that may provide at least some stiffness, at least some flexibility, and at least some elastic memory to each pocket 105.

Continuing discussing FIG. 1, in some embodiments, cone-like-structure 101 may appear substantially cone shaped in appearance, with the larger diameter being substantially scalloped; and without a cone point/tip.

Continuing discussing FIG. 1, in some embodiments, integral-collar 103 may be a substantially collar like structure, configured to be removably worn around the neck of the given pet (animal). In some embodiments, integral-collar 103 may be an elongate member that may be flexible and/or pliable to bend substantially around the neck of the given pet (animal). In some embodiments, integral-collar 103 may comprise a region that may be substantially elongate, flexible, planar, flat, and with a given fixed predetermined width (e.g., flat width 104); wherein portions of this region may be intended to come into removable physical contact with portions of the pet's 1399 (animal's 1399) neck; wherein this region of integral-collar 103 may be intended to more evenly distribute impact loads to the pet's 1399 (animal's 1399) neck. An impact load may occur when the pet 1399 (animal 1399) wearing cone-collar 100 has collisions with the environment. Being able to better distribute such impact loads may make cone-collar 100 more safe and/or more comfortable as compared to prior art E-collars. In some embodiments, integral-collar 103 may comprise two opposing terminal ends, a first-terminal-end 117 and a second-terminal-end 1217 (see FIG. 12 for second-terminal-end 1217).

In some embodiments, integral-collar 103 may have a substantially flat width 104, wherein at least portion of this substantially flat width 104 may be for removable physical contact with a neck of an animal 1399 to evenly distribute loads on cone-like-structure 101 to this substantially flat width 104.

Figure 2:
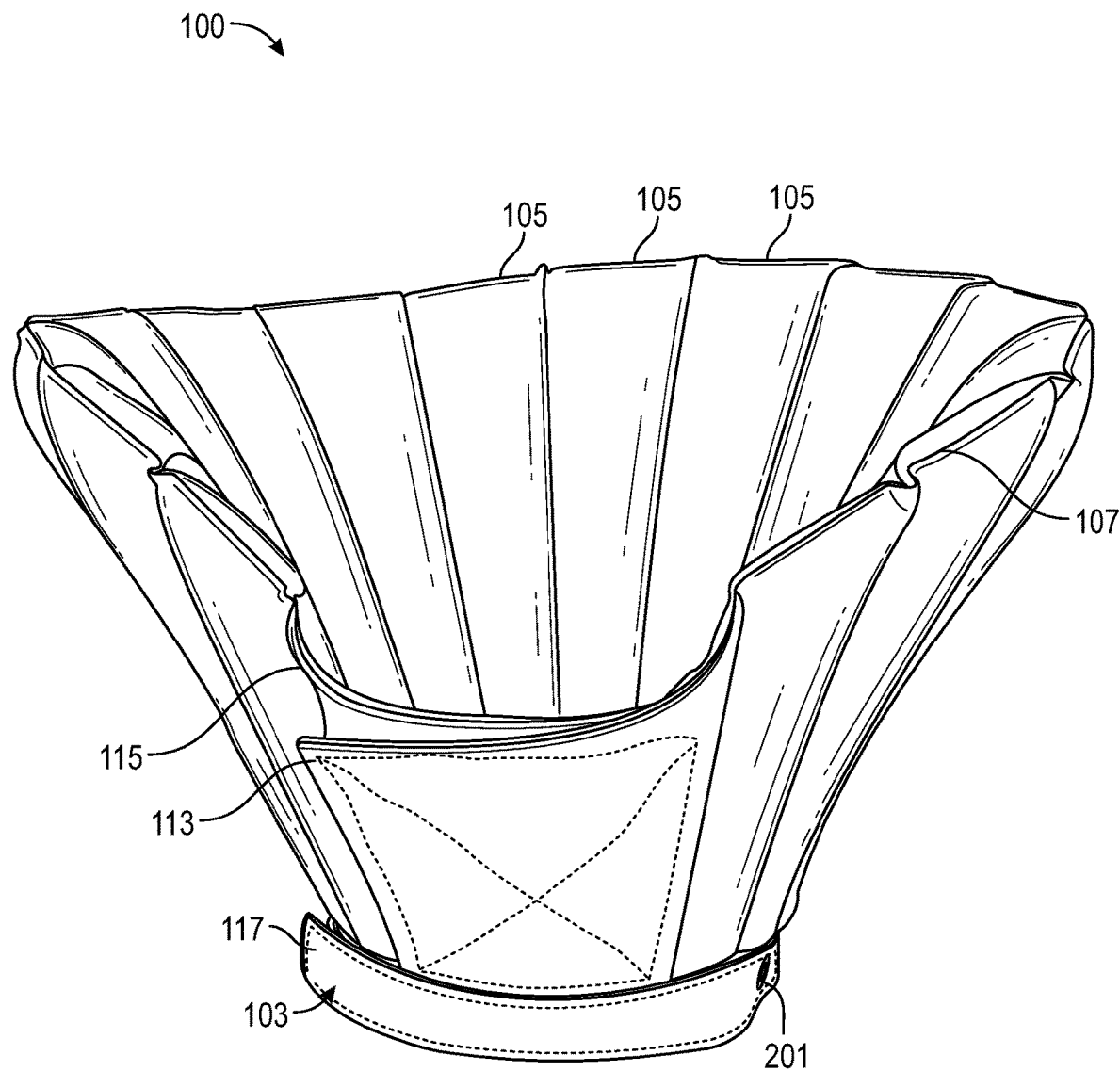
FIG. 2 may show a front view of the cone-collar of FIG. 1.

FIG. 2 may show a front view of cone-collar 100. In some embodiments, integral-collar 103 may comprise at least one grommet 201. In some embodiments, integral-collar 103 may comprise one or more grommets 201. In some embodiments, the at least one grommet 201 may be located on flat width 104 of integral-collar 103. In some embodiments, a given grommet 201 may be a reinforced hole passing entirely through flat width 104 of integral-collar 103. In some embodiments, integral-collar 103 may comprise a predetermined quantity of grommets 201. In some embodiments, integral-collar 103 may comprise three grommets 201. In some embodiments, integral-collar 103 may comprise three grommets 201 that may be substantially equal distance from each other on integral-collar 103. In some embodiments, integral-collar 103 may comprise three grommets 201 that may be spaced from other substantially equally along a length of integral-collar 103. In some embodiments, a given grommet 201 may be replaced with a hole 201 through cone-collar 100. In some embodiments, this hole may be reinforced.

In some embodiments, integral-collar 103 may have at least one hole 201 passing entirely through width 104 of integral-collar 103; wherein this at least one hole 201 may at least function as a location for mechanical attachment.

In some embodiments, such grommet(s) 201 (or through holes) may be used to use facilitate securing (attaching) integral-collar 103 to a harness (or harness like structure) being removably worn by the given animal 1399. In some embodiments, removably attaching integral-collar 103 to such a harness (or harness like structure), may help to prevent or minimize undesirable rotation of integral-collar 103 around the given animal's neck.

Figure 3:
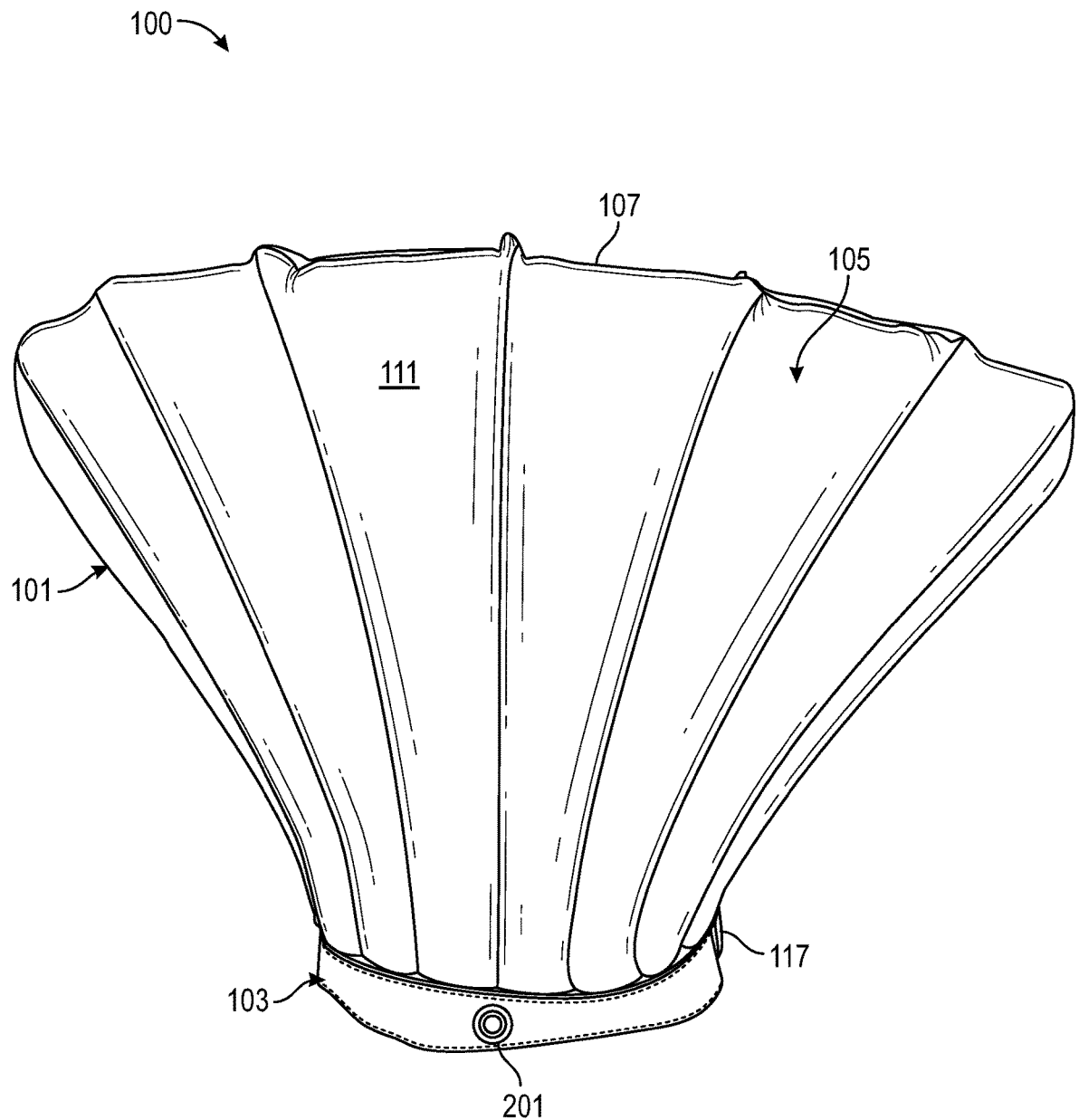
FIG. 3 may show a back view of the cone-collar of FIG. 1.

FIG. 3 may show a back view of cone-collar 100. FIG. 3 may depict grommet 201 of integral-collar 103.

Figure 4:
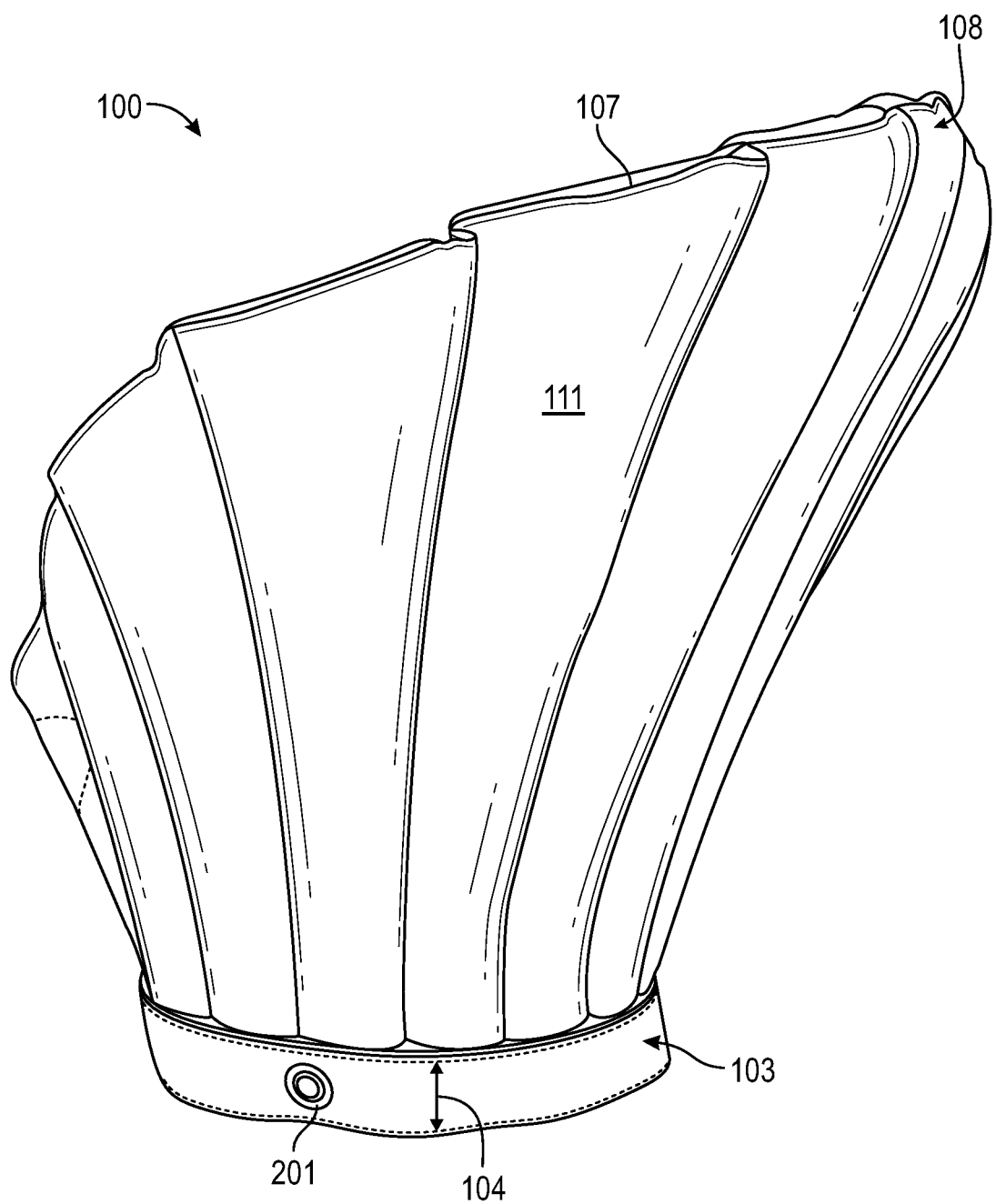
FIG. 4 may show a right-side view of the cone-collar of FIG. 1.

FIG. 4 may show a right-side view of cone-collar 100. FIG. 4 may depict grommet 201 of integral-collar 103. FIG. 4 may also depict the scalloped shape of cone-like-structure 101. FIG. 4 may also show flat width 104 of integral-collar 103. In some embodiments, integral-collar 103 may have a fixed and predetermined width, denoted herein as flat width 104. In some embodiments, the width of integral-collar 103 may be substantially flat, denoted herein as flat width 104. FIG. 4 may depict longest-panel 108. In some embodiments, longest-panel 108 may be one or more panels selected from the plurality of radially-oriented-tapered-pockets 105. In some embodiments, longest-panel 108 may the longest of the radially-oriented-tapered-pockets 105.

Figure 5:
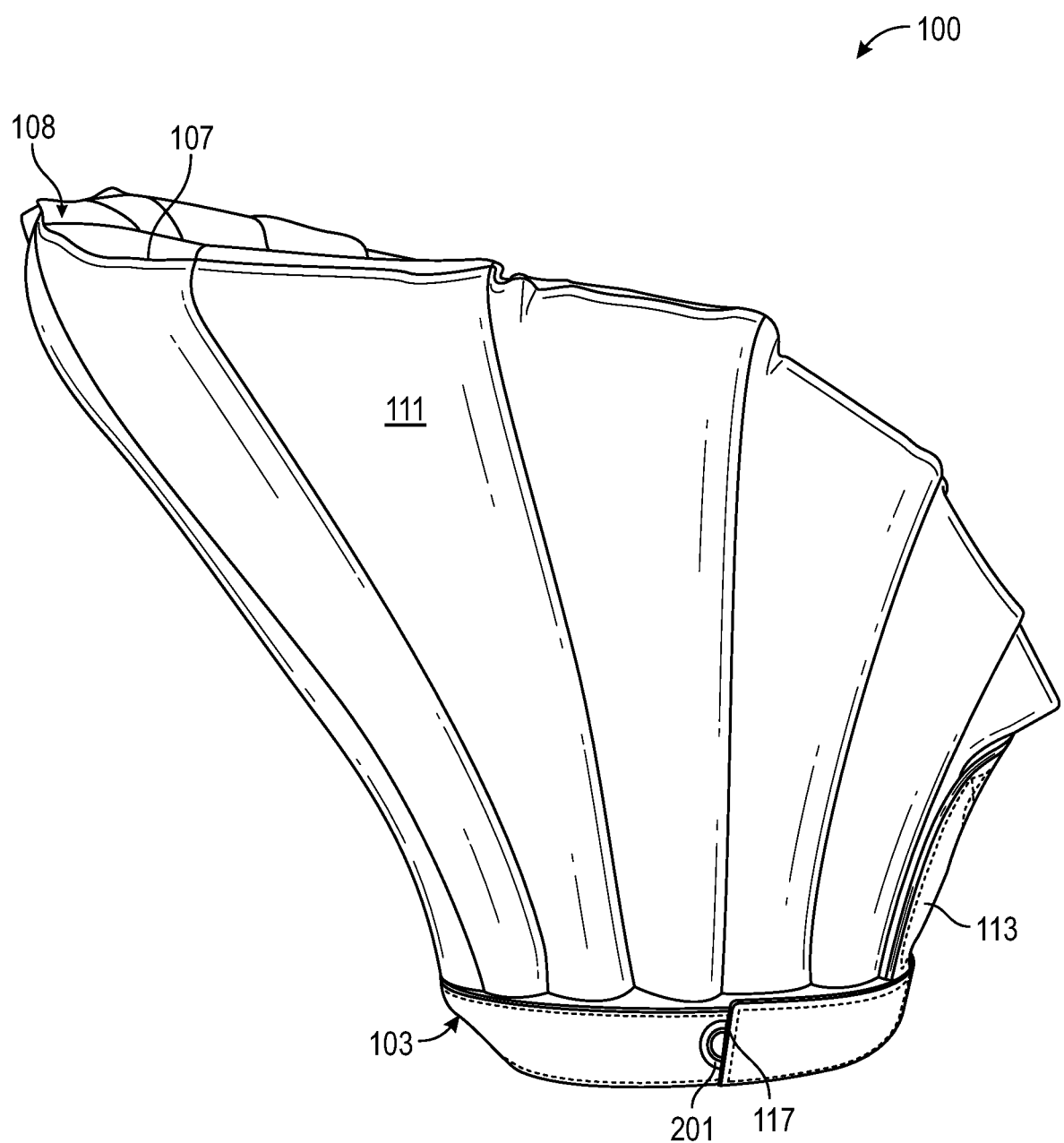
FIG. 5 may show a left-side view of the cone-collar of FIG. 1.

FIG. 5 may show a left-side view of cone-collar 100. FIG. 5 may depict grommet 201 of integral-collar 103. FIG. 5 may also depict the scalloped shape of cone-like-structure 101.

In some embodiments, cone-collar 100 may comprise cone-like-structure 101 and integral-collar 103. In some embodiments, cone-like-structure 101 may be substantially cone shaped, but without a tip of a cone. In some embodiments, when cone-like-structure 101 may be in the closed configuration, the cone shape of cone-like-structure 101 may be scalloped. See e.g., FIG. 4 and FIG. 5. In some embodiments, integral-collar 103 may be an elongate, a flexible, and a planar member. In some embodiments, integral-collar 103 may function at least as a pet collar being removably worn around the neck of animal 1399 when the cone-collar 100 may be being removably worn by animal 1399. In some embodiments, cone-like-structure 101 may be attached to integral-collar 103. In some embodiments, during use of cone-collar 100, when the cone-collar 100 may be removably attached to the neck of animal 1399, then cone-like-structure 101 may be a physical barrier inhibiting an ability of animal 1399 to bite, lick, or scratch a region of the animal's body.

Figure 6:
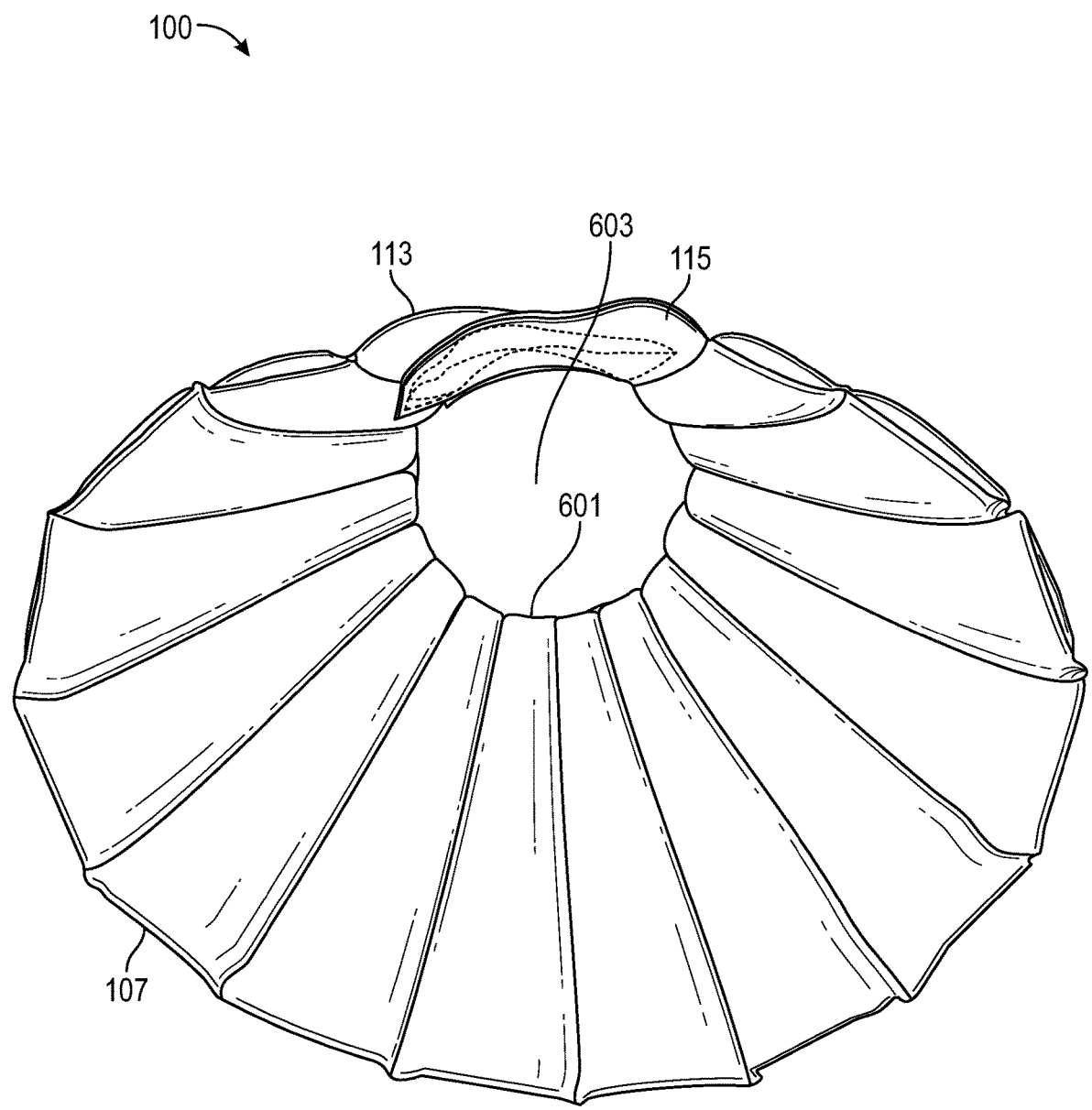
FIG. 6 may show a top view of the cone-collar of FIG. 1.

FIG. 6 may show a top view of cone-collar 100 that may clearly show the smaller diameter 601 and the larger diameter (defined by outer-greater-edge 107) of cone-collar 100. In some embodiments, the larger diameter may run substantially along outer-greater-edge 107. In some embodiments, the smaller diameter 601 may be formed from closed integral-collar 103 (i.e., in the closed configuration). In some embodiments, the smaller diameter 601 may be formed from closed inner-lesser-edge 901 (i.e., in the closed configuration). In some embodiments, the larger diameter and the smaller diameter 601 may be substantially disposed opposite from each other. In some embodiments, smaller diameter 601 may substantially circumscribe (and may be proximate to or in physical contact with) the neck of the animal (pet) during normal wearing use of cone-collar 100. FIG. 6 may also show imaginary central axis 603 which may be located substantially within a center of smaller diameter 601. In some embodiments, the plurality of radially-oriented-tampered-pockets 105 may extend radially outward from imaginary central axis 603 (but not touching imaginary central axis 603).

In some embodiments, with respect to the closed configuration of the cone-like-structure 101, the plurality of connected panels 105 may be radially oriented with respect to an imaginary central axis 603 running through a center of this closed configuration.

Figure 7:
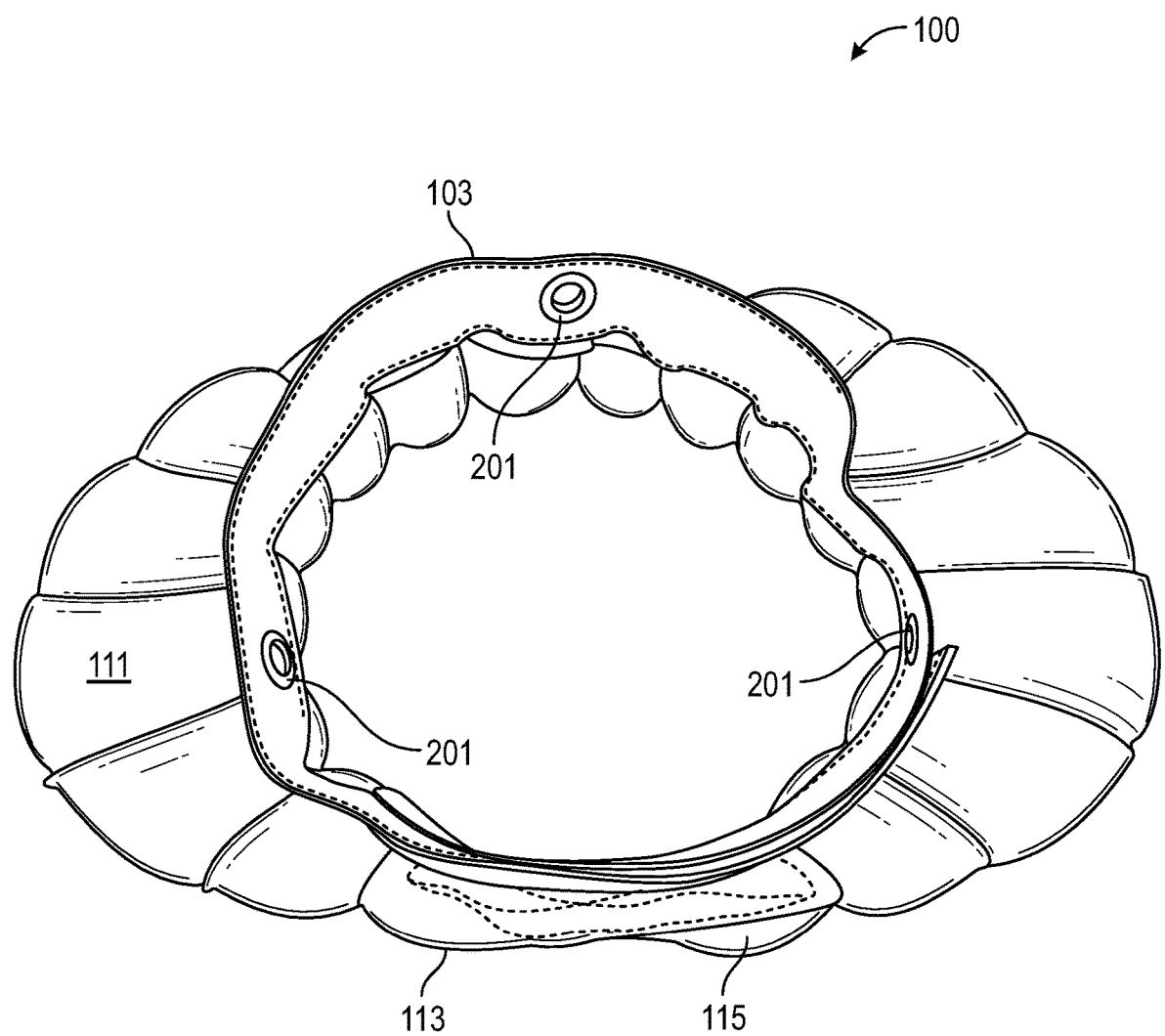
FIG. 7 may show a bottom view of the cone-collar of FIG. 1.

FIG. 7 may show a bottom view of cone-collar 100. FIG. 7 may depict grommet(s) 201 of integral-collar 103.

Figure 8:
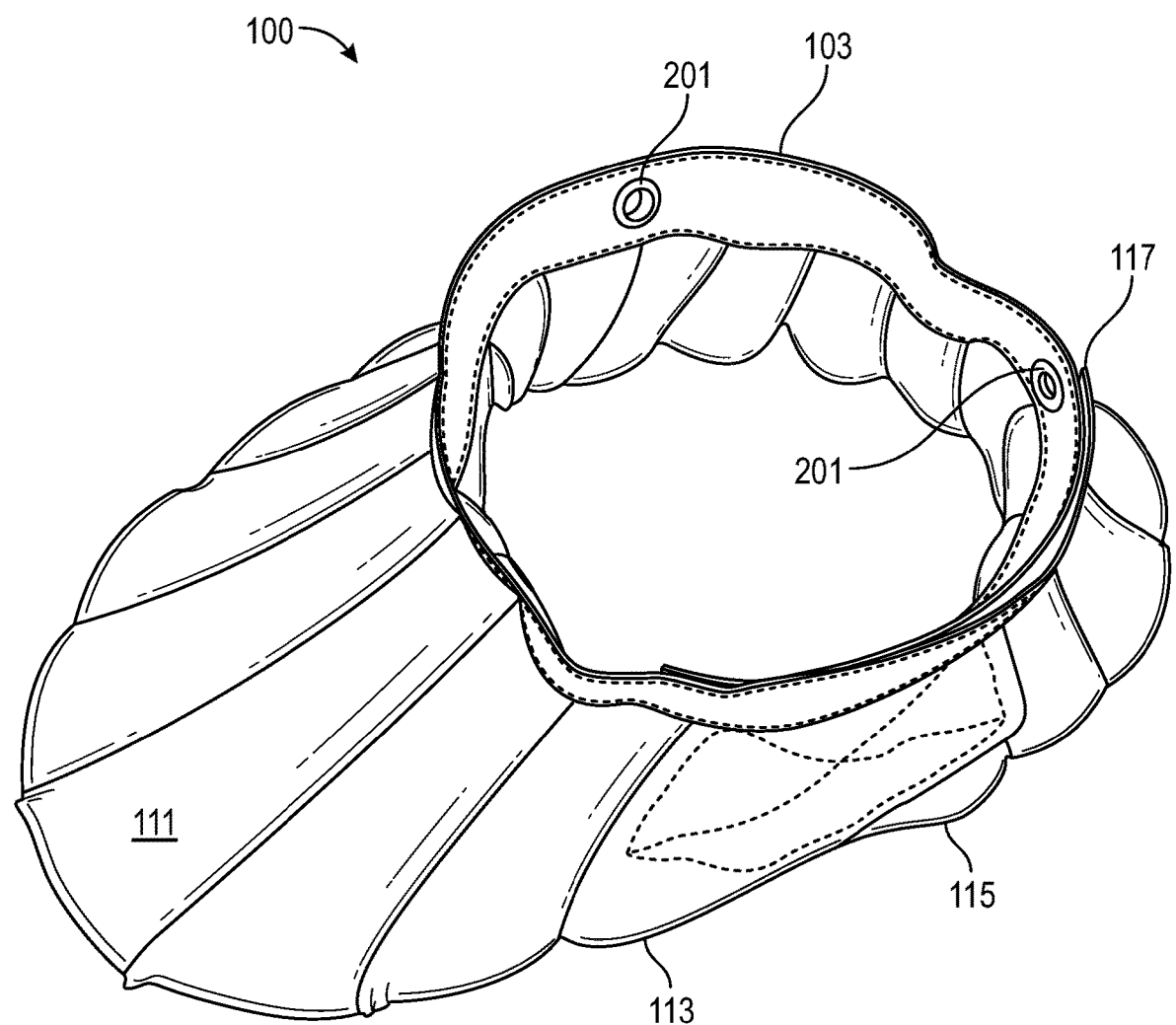
FIG. 8 may show a bottom perspective view of the cone-collar of FIG. 1.

FIG. 8 may show a bottom perspective view of cone-collar 100. FIG. 8 may depict grommet(s) 201 of integral-collar 103.

Figure 9:
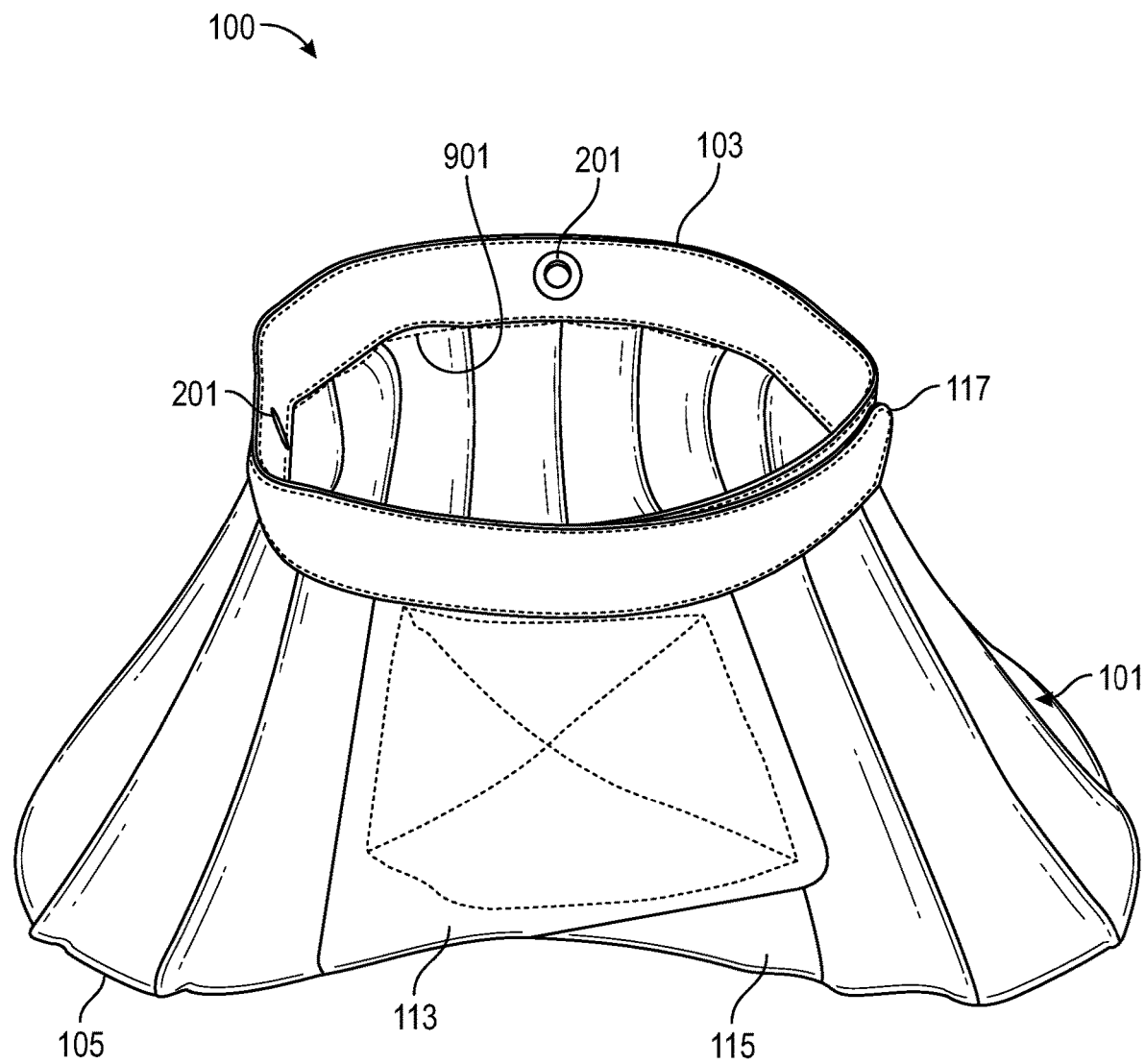
FIG. 9 may show a bottom front perspective view of the cone-collar of FIG. 1.

FIG. 9 may show a bottom front perspective view of cone-collar 100. FIG. 9 may depict grommet(s) 201 of integral-collar 103. FIG. 9 may depict inner-lesser-edge 901. In some embodiments, inner-lesser-edge 901 may be the opposing radial end of a given radially-oriented-tapered-pocket 105. In some embodiments, inner-lesser-edge 901 may be disposed opposite from outer-greater-edge 107. In some embodiments, at or proximate to inner-lesser-edge 901 may be where cone-like-structure 101 is attached to (joined to) integral-collar 103.

In some embodiments, each panel 105 selected from the plurality of connected panels 105 may extends from inner-lesser-edge 901 to outer-greater-edge 107. In some embodiments, inner-lesser-edge 901 may be shorter in length than outer-greater-edge 107. In some embodiments, imaginary central axis 603 may be closer to inner-lesser-edge 901 than to outer-greater-edge 107.

In some embodiments, from inner-lesser-edge 901 to outer-greater-edge 107, cone-like-structure 101 may be of fixed but different lengths, wherein a shortest length is at the two flaps (113 and 115), wherein a longest length may be of a panel 108 selected from the plurality of connected panels 105 that may be substantially equal distant from each of the two flaps (113 and 115), wherein this panel 108 may be longest-panel 108.

In some embodiments, at or proximate to inner-lesser-edge 901, cone-like-structure 101 may be attached to integral-collar 103 along a portion of a length of integral-collar 103.

In some embodiments, each panel 105 selected from the plurality of connected panels 105 may be wider towards outer-greater-edge 107 and narrower towards inner-lesser-edge 901.

Figure 10:
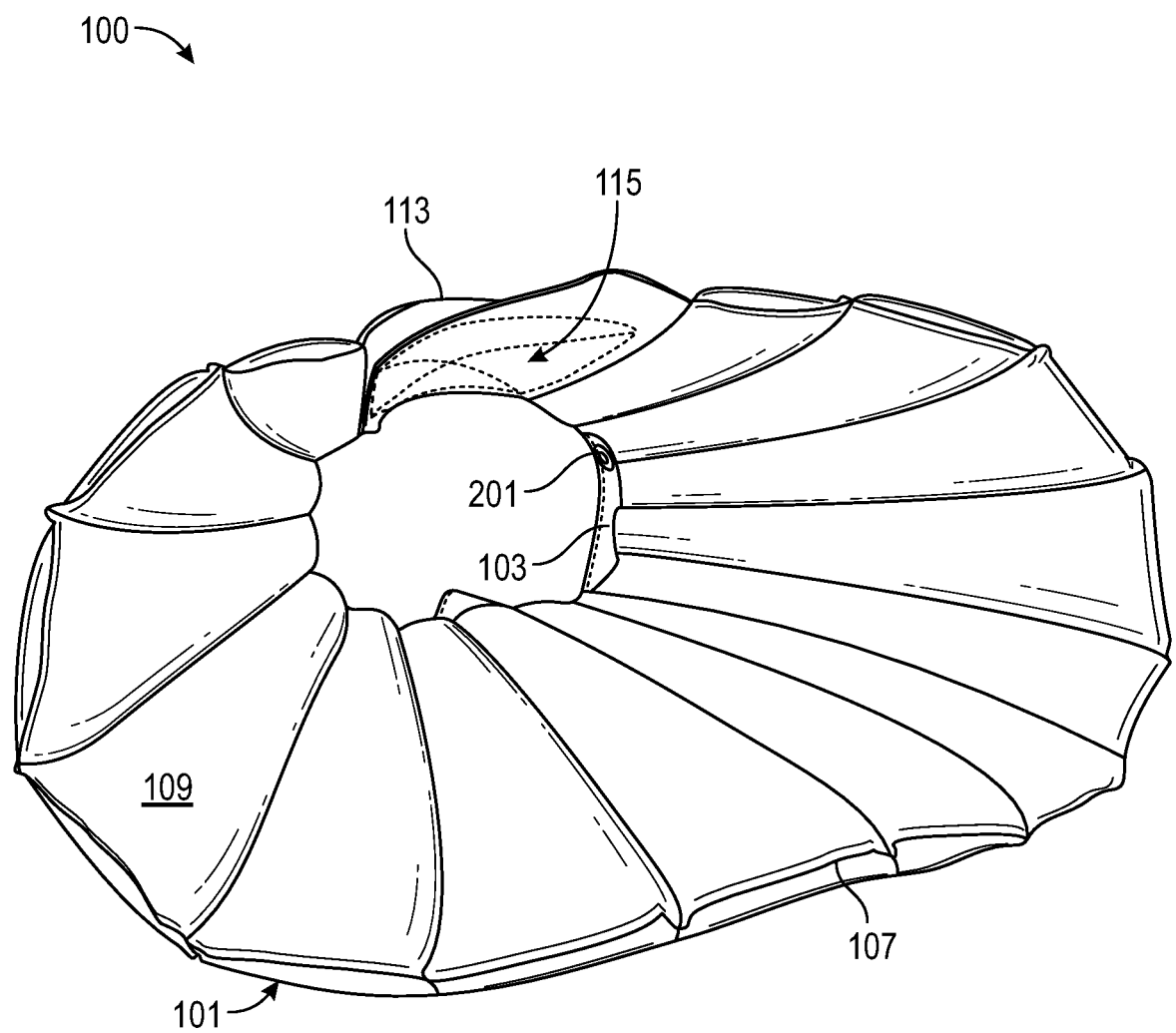
FIG. 10 may show a top perspective view of the cone-collar of FIG. 1.

FIG. 10 may show a top perspective view of cone-collar 100. FIG. 10 may depict portions of cone-like-structure 101. FIG. 10 may depict outer-greater-edge 107. FIG. 10 may depict inner-flap 115. FIG. 10 may depict a portion of integral-collar 103.

Figure 11:
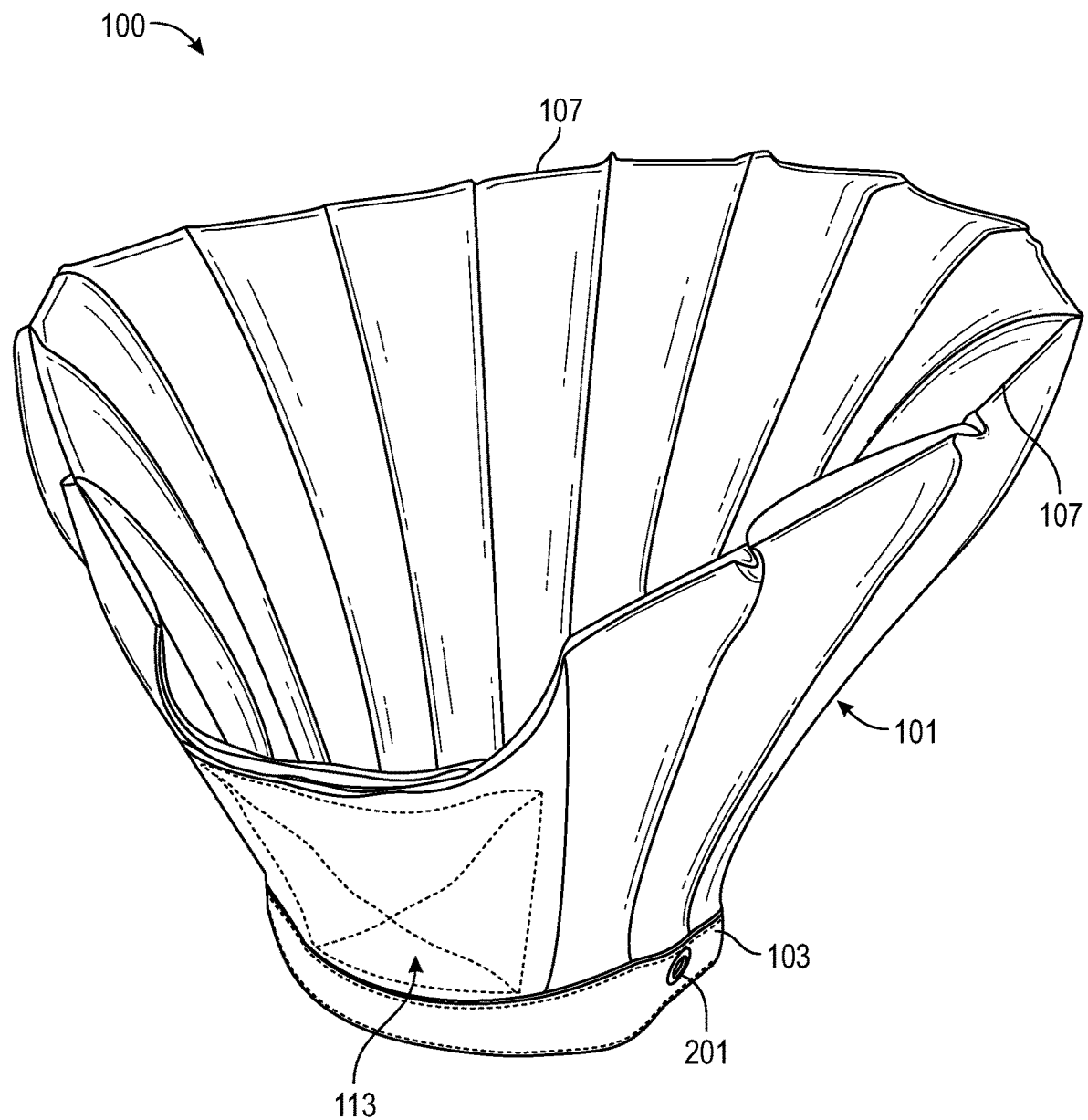
FIG. 11 may show a top right perspective view of the cone-collar of FIG. 1.

FIG. 11 may show a top right perspective view of cone-collar 100. FIG. 11 may depict portions of cone-like-structure 101. FIG. 11 may depict outer-greater-edge 107. FIG. 11 may depict outer-flap 113. FIG. 11 may depict portions of integral-collar 103. FIG. 11 may depict grommet 201.

Figure 12:
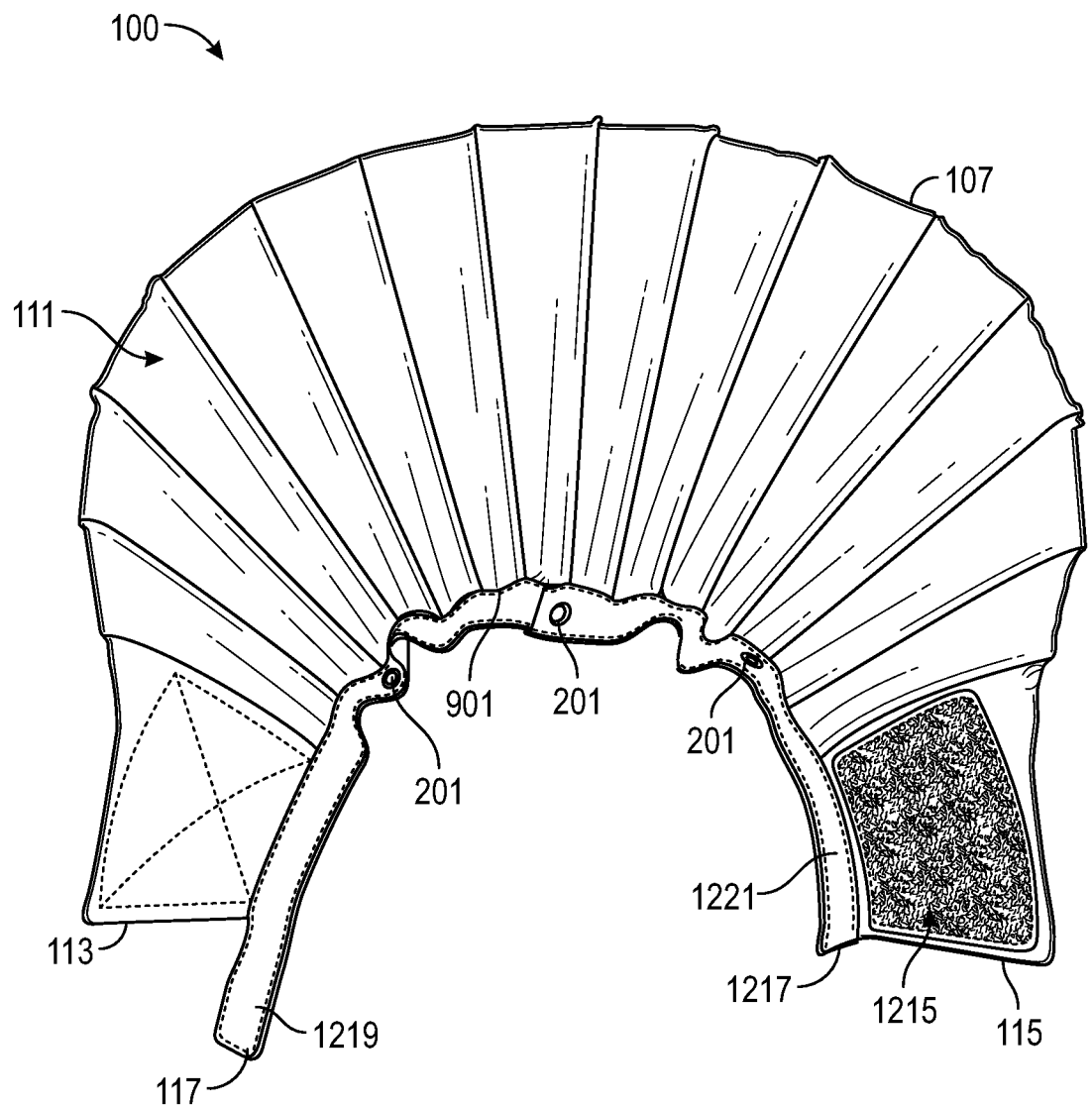
FIG. 12 may show the cone-collar of FIG. 1 in an open configuration.

FIG. 12 may show cone-collar 100 in an open configuration. Whereas, FIG. 1 through FIG. 11 may have shown cone-collar 100 in the closed configuration. Exterior-facing-surface 111 may be shown in FIG. 12. FIG. 12 may show inner-lesser-edge 901.

Continuing discussing FIG. 12, in some embodiments, outer-flap 113 may removably attach to inner-flap 115. In some embodiments, integral-collar 103 may have two opposing terminal ends (e.g., 117 and 1217) that may be removably attachable to each other to function as a pet collar. In some embodiments, inner-flap 115 may comprise flap-fastener 1215. In some embodiments, outer-flap 113 may comprise another flap-fastener that may be complimentary to flap-fastener 1215, such that there may be removable attachment between these two respective flap-fasteners. In some embodiments, these two flap-fasteners may be a type of mechanical fastener. In some embodiments, this type of mechanical fastener may be of a type typical or common with garments, fabric, canvas, and the like. In some embodiments, this type of mechanical fastener may be selected from one or more of: hook and loop type fasteners (e.g., Velcro or Velcro like); tongue and groove; Ziploc (or Ziploc like); snap(s); button(s); zipper(s); clips; clip and hole; clip and loop; strings; ties; and/or the like. In some embodiments, such flap-fasteners may be substantially planar members; wherein because of being planar members, this may provide for differences in overlap of these flap-fasteners, which in turn may then provide for some adjustment ability in the removable attachment of outer-flap 113 to inner-flap 115.

Continuing discussing FIG. 12, in some embodiments, first-terminal-end 117 may removably attach to second-terminal-end 1217. In some embodiments, first-terminal-end 117 and second-terminal-end 1217 may be opposing terminal ends of integral-collar 103. In some embodiments, first-terminal-end 117 may removably attach to a portion on integral-collar 103 past, but proximate, to second-terminal-end 1217, such that smaller diameter 601 may be formed. In some embodiments, first-terminal-end 117 may comprise collar-fastener 1219. Note, in FIG. 12, collar-fastener 1219 is actually on the other side (e.g., interior-facing-surface 109 side) of the region proximate to first-terminal-end 117. In some embodiments, second-terminal-end 1217 or a region proximate to second-terminal-end 1217 may comprise another collar-fastener, complimentary-collar-fastener 1221, that may be complimentary to collar-fastener 1219, such that there may be removable attachment between these two respective collar-fasteners in the closed configuration. In some embodiments, these two collar-fasteners (e.g., 1219 and 1221) may be a type of mechanical fastener. In some embodiments, this type of mechanical fastener may be of a type typical or common with garments, fabric, canvas, and the like. In some embodiments, this type of mechanical fastener may be selected from one or more of: hook and loop type fasteners (e.g., Velcro or Velcro like); tongue and groove; Ziploc (or Ziploc like); snap(s); button(s); zipper(s); clips; clip and hole; clip and loop; strings; ties; and/or the like. In some embodiments, such collar-fasteners (e.g., 1219 and 1221) may be substantially planar members; wherein because of being planar members, this may provide for differences in overlap of these collar-fasteners, which in turn may then provide for some adjustment in the removable attachment of first-terminal-end 117 to second-terminal-end 1217 or to the portion on integral-collar 103 past, but proximate, to second-terminal-end 1217.

In some embodiments, one side of integral-collar 103 may comprise such collar-fasteners. In some embodiments, one side of integral-collar 103 may comprise collar-fastener 1219 (e.g., interior-facing-surface 109 side); while the other side (e.g., exterior-facing-surface 111 side) may comprise complimentary-collar-fastener 1221. In some embodiments, both sides (e.g., 109 and 111) of integral-collar 103 may comprise such collar-fasteners.

Continuing discussing FIG. 12, in some embodiments, each radially-oriented-tapered-pocket 105 selected from the plurality of radially-oriented-tapered-pockets 105 may be wider towards outer-greater-edge 107 and narrower towards inner-lesser-edge 901.

Continuing discussing FIG. 12, in some embodiments, the plurality of radially-oriented-tapered-pockets 105 may comprise fourteen (14) radially-oriented-tapered-pockets 105. In some embodiments, the plurality of radially-oriented-tapered-pockets 105 may comprise from nine (9) to twenty-one (21) radially-oriented-tapered-pockets 105. In some embodiments, the plurality of connected panels 105 may be a fixed number of such panels 105 from nine (9) to twenty-one (21) panels 105.

In some embodiments, a given radially-oriented-tapered-pocket 105 may also be known as a radially-oriented-tapered-panel, a radially-oriented-tapered-section, or more simply as a panel.

Figure 13A:
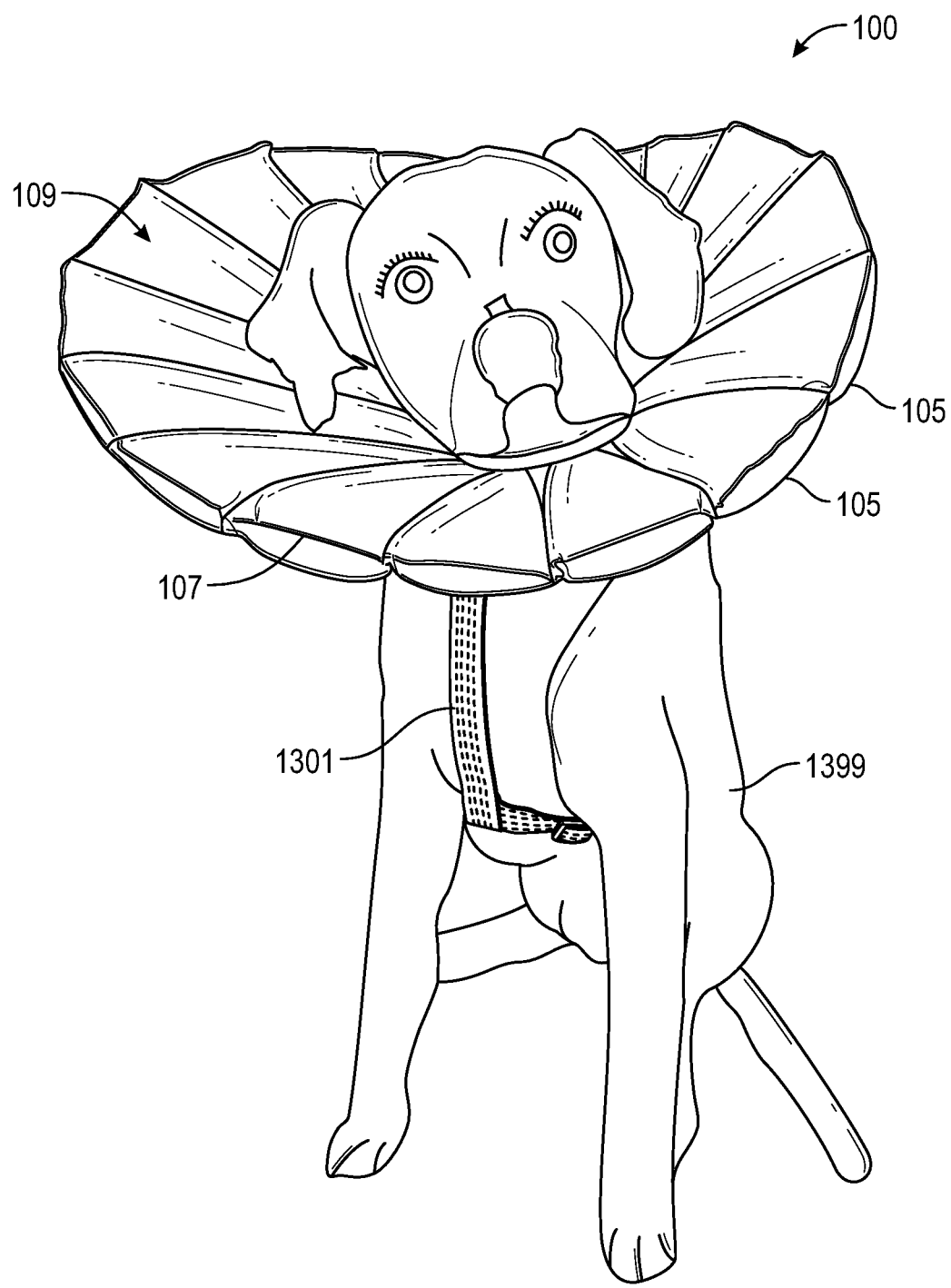
FIG. 13A may show the cone-collar of FIG. 1 in use, from a front sitting view of a pet wearing this cone-collar.

FIG. 13A may show cone-collar 100 in use, from a front sitting view of a pet 1399 (animal 1399) wearing this cone-collar 100. During use, in some embodiments, cone-collar 100 may be in the closed configuration. During use, in some embodiments, integral-collar 103 may circumscribe the pet's 1399 (animal's 1399) neck. During use, in some embodiments, pet 1399 (animal 1399) may also be wearing harness 1301 (or harness like structure). In some embodiments, harness 1301 may be adjustable. In some embodiments, harness 1301 may be non-rotatable when removably attached to the body of the given animal (pet). In some embodiments, integral-collar 103 may be attached (removably in some embodiments) to harness 1301. In some embodiments, integral-collar 103 may be attached to harness 1301 in a manner that minimizes rotational movement of integral-collar 103 around the pet's 1399 (animal's 1399) neck. In some embodiments, one or more grommet(s) 201 of integral-collar 103 may facilitate removable attachment of integral-collar 103 to harness 1301.

Continuing discussing FIG. 13A, during use, in some embodiments, the longest radially-oriented-tapered-pocket (s) 105 may be positioned beneath the pet's 1399 (animal's 1399) jaw; which in turn may provide for relatively shorter radially-oriented-tapered-pockets 105 to be proximate the pet's 1399 (animal's 1399) eyes. During use, in some embodiments, the shortest radially-oriented-tapered-pockets 105 may be positioned towards the back of the pet's 1399 (animal's 1399) neck; which in turn may provide for relatively shorter radially-oriented-tapered-pockets 105 to be proximate the pet's 1399 (animal's 1399) eyes. Having the relatively shorter radially-oriented-tapered-pockets 105 being proximate the pet's 1399 (animal's 1399) eyes may reduce vision blockage (i.e., minimizing blockage to peripheral vision) in the pet 1399 (animal 1399). Having the relatively shorter radially-oriented-tapered-pockets 105 being proximate the pet's 1399 (animal's 1399) eyes may reduce anxiety in the pet 1399 (animal 1399). See also FIG. 13C which also illustrates these principals.

Figure 13B:
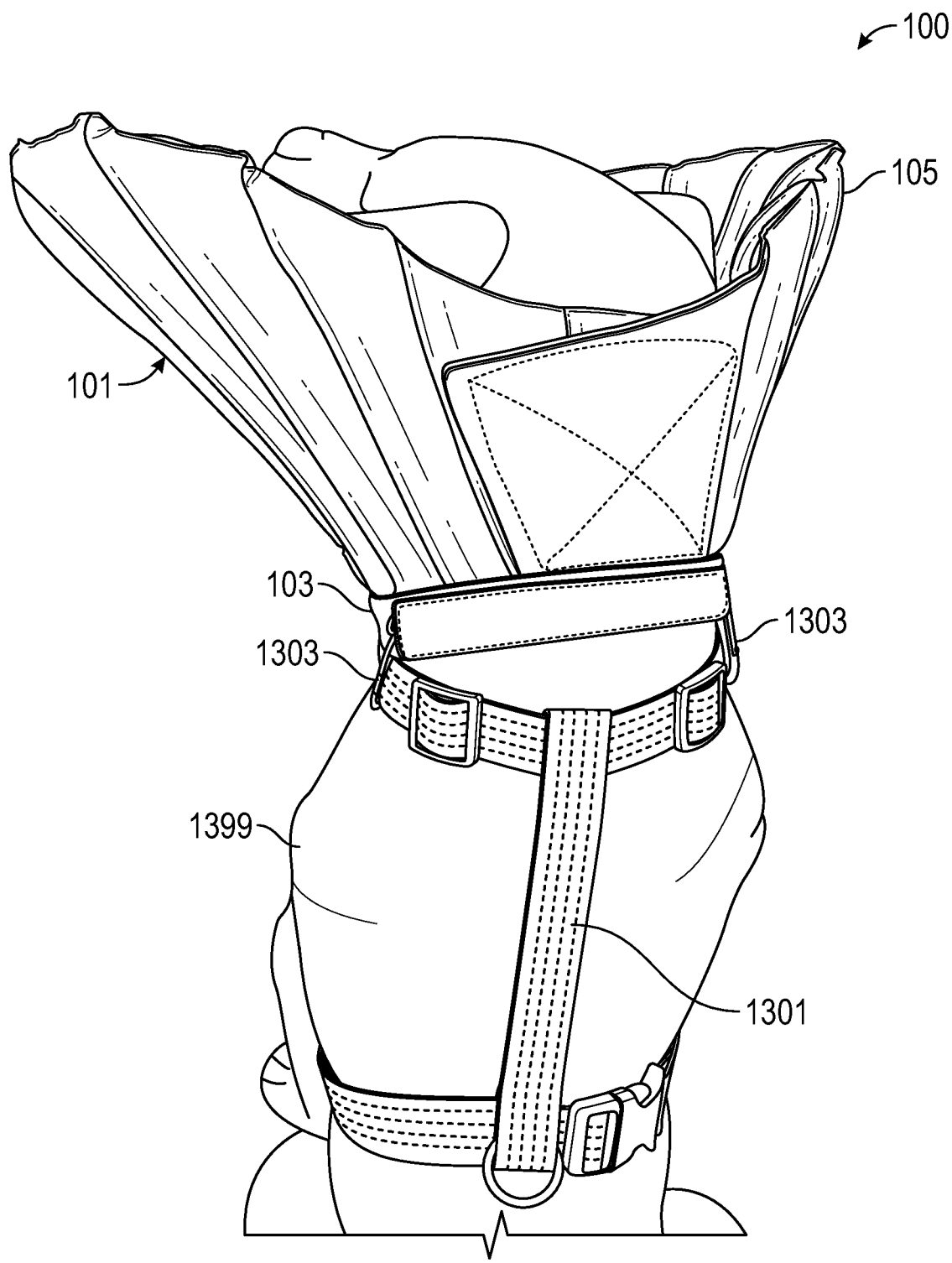
FIG. 13B may show the cone-collar of FIG. 1 in use, from a view of the pet's backside, while the pet is wearing this cone-collar.

FIG. 13B may show cone-collar 100 in use, from a view of the pet's 1399 (animal's 1399) backside, while the pet 1399 (animal 1399) is wearing this cone-collar 100. FIG. 13B may show use of mechanical-fastener 1303 to removably attach integral-collar 103 to harness 1301. In some embodiments, mechanical-fastener 1303 may be a linkage from integral-collar 103 to harness 1301. In some embodiments, mechanical-fastener 1303 may removably attach to integral-collar 103. In some embodiments, mechanical-fastener 1303 may removably attach grommet 201. In some embodiments, mechanical-fastener 1303 may be a linkage. In some embodiments, mechanical-fastener 1303 may removably attach to harness 1301. In some embodiments, mechanical-fastener 1303 may be selected from one or more of: a carabiner, a D-link, a D-ring, a string, a cord, a rope, a zip-tie, a tie, a chain, a chain link, a button, a snap, hook and loop fastener (e.g., Velcro or Velcro like), Ziploc (or Ziploc like), tongue and groove connection, tape, and/or the like. In some embodiments, cone-collar 100 may comprise at least one linkage 1303 that may be attached to at least one hole 201 of integral-collar 103.

In some embodiments, "harness 1301" may be "other-collar 1301," as in a collar other than integral-collar 103. In some embodiments, "harness 1301" may be replaced with "other-collar 1301." In some embodiments, other-collar 1301 and integral-collar 103 may be separate and distinct collars; that in some embodiments, may be removably attached to each other via one or more mechanical-fastener (s) 1303.

In some embodiments, cone-collar 100 may comprise mechanical-fastener 1303. In some embodiments, cone-collar 100 may comprise harness 1301. In some embodiments, integral-collar 103 may comprise mechanical-fastener 1303. In some embodiments, cone-collar 100 may comprise harness 1301 and mechanical-fastener 1303.

In some embodiments, a system for inhibiting licking, biting, or scratching of a body region of an animal may be described and disclosed herein. In some embodiments, such a system may comprise at least one cone-collar 100 and at least one mechanical-fastener 1303. In some embodiments, such a system may comprise at least one cone-collar 100 and at least one harness 1301. In some embodiments, such a system may comprise at least one cone-collar 100, at least one harness 1301, and at least one mechanical-fastener 1303. In some embodiments, these systems may be for providing adequate protection to the pet 1399 (animal 1399) against self-inflicted licking and/or biting at an area on the pet 1399 (animal 1399) where it may be desired to minimize or avoid such licking and/or biting. In some embodiments, these systems may be for preventing or mitigating against self-inflicted licking and/or biting at an area on the pet 1399 (animal 1399) where it may be desired to prevent or minimize such licking and/or biting. In some embodiments, such areas on the pet 1399 (animal 1399) may be areas that are injured, healing, recovering, and/or the like. For example, and without limiting the disclosure of the present invention, after a surgical procedure where an incision may be closed, it may be desirable to minimize or prevent licking and/or biting at the incision site until it heals sufficiently.

Figure 13C:
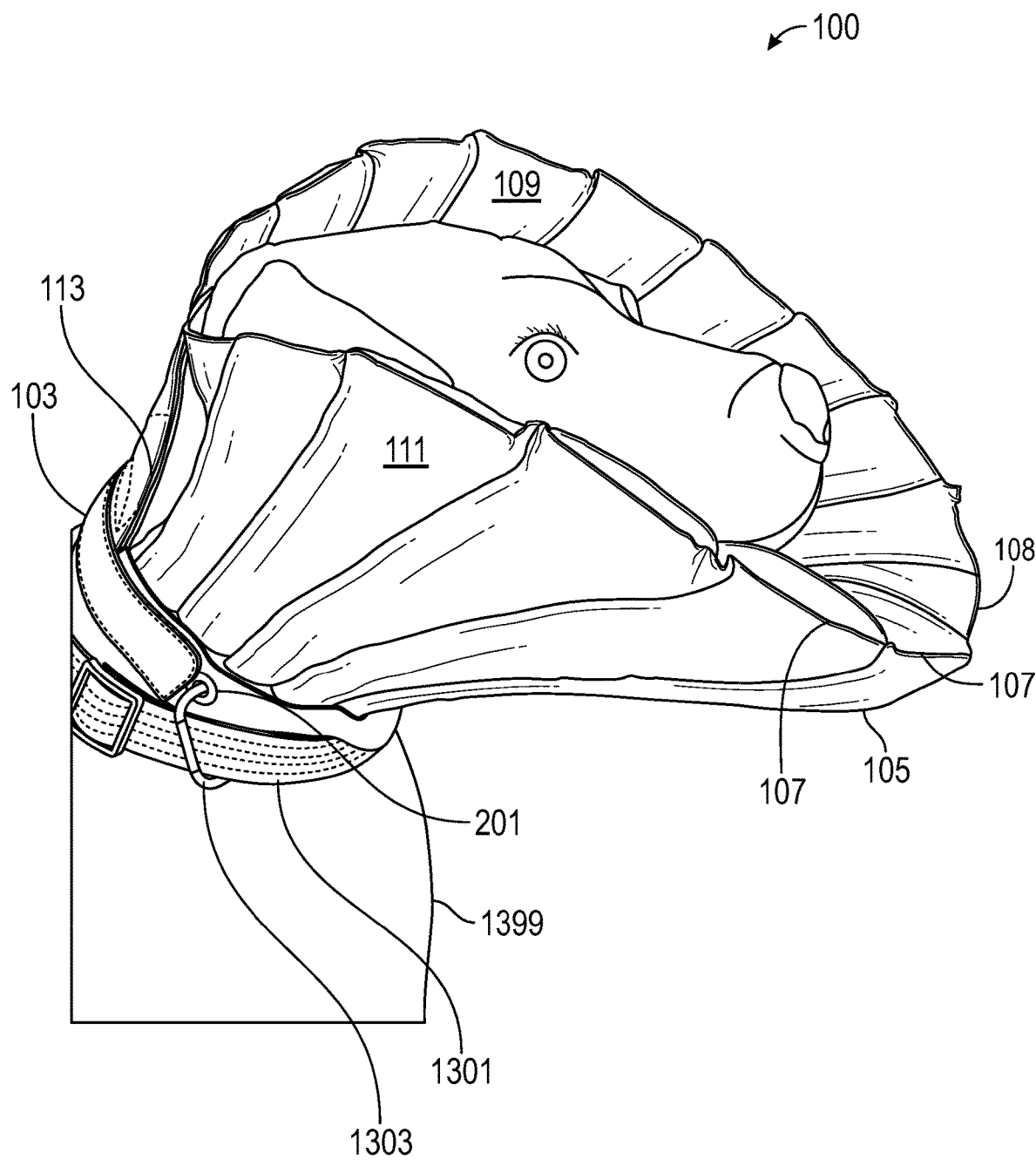
FIG. 13C may show the cone-collar of FIG. 1 in use, from a side sitting view of the pet wearing this cone-collar.

FIG. 13C may show cone-collar 100 in use, from a side sitting view of the pet 1399 (animal 1399) wearing this cone-collar 100. In some embodiments, when cone-collar 100 may be properly worn by pet 1399 (animal 1399), the shortest portions of cone-collar 100 may be closest to (proximate to) the back neck of pet 1399 (animal 1399); whereas, the longest portions of cone-collar 100 may be closest to (proximate to) to an end of a mouth (snout) of pet 1399 (animal 1399). Such scalloped geometry of cone-collar 100 may provide for benefits. Such benefits may be providing most protection where it is needed, i.e., having the longest portions of cone-collar 100 nearest to where pet 1399 (animal 1399) bites and/or licks from—the mouth/snout region. Such benefits of this scalloped design may provide for less visual blockage to pet 1399 (animal 1399) at their sides of their head, which may reduce stress to pet 1399 (animal 1399) when wearing cone-collar 100. Such benefits of this scalloped design may be reducing a likelihood of cone-collar 100 catching and/or colliding with environmental objects versus a non-scalloped design. Such benefits of this scalloped design may be less weight overall for cone-collar 100 versus if all the pocket (panels or sections) lengths were substantially the same; and such a reduction in weight reduces fatigue for pet 1399 (animal 1399) when cone-collar 100 may be worn; and such a reduction in weight may provide for manufacturing and shipping cost savings. In some embodiments, a given cone-collar 100 may weigh from about 4 ounces (for a small size with an average neck diameter of about 4 inches) to about 20 ounces (for a larger size with an average neck diameter of about 6 inches); wherein "about" in this context may be plus or minus 1 ounce and plus or minus 1 inch, respectively.

In some embodiments, when cone-collar 100 may be removably worn around the neck of animal 1399 properly, then longest-panel 108 may be arranged below a nose of animal 1399 and shorter panels 105 selected from the plurality of connected panels 105 may be proximate to eyes of animal 1399 so as to not restrict vision of animal 1399. See e.g., FIG. 13C.

In some embodiments, such proper wearing of cone-collar 100 on pet 1399 (animal 1399) may be accomplished and maintained by removably securing integral-collar 103 to harness 1301 via use of one or more mechanical-fastener(s) 1303. See e.g., FIG. 13C and FIG. 13B.

Figure 13D:
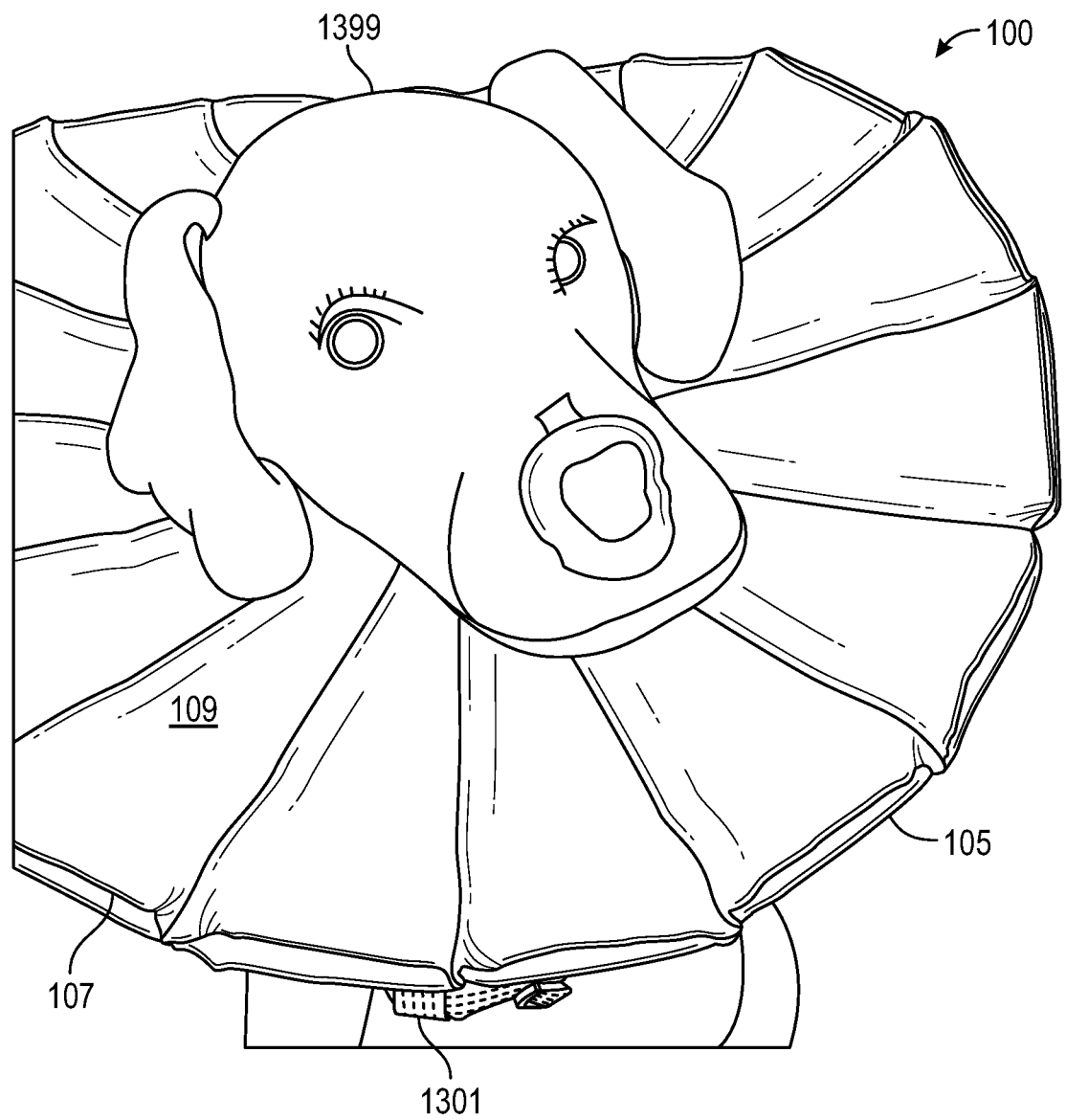
FIG. 13D may show the cone-collar of FIG. 1 in use, from a front sitting view of a pet wearing this cone-collar.

FIG. 13D may show cone-collar 100 in use, from a front sitting view of pet 1399 (animal 1399) wearing this cone-collar 100. In some embodiments, when cone-collar 100 may be properly worn by pet 1399 (animal 1399), the shortest portions of cone-collar 100 may be closest to (proximate to) the back neck of pet 1399 (animal 1399); whereas, the longest portions of cone-collar 100 may be closest to (proximate to) to the end of the mouth (snout) of pet 1399 (animal 1399).

Figure 14:
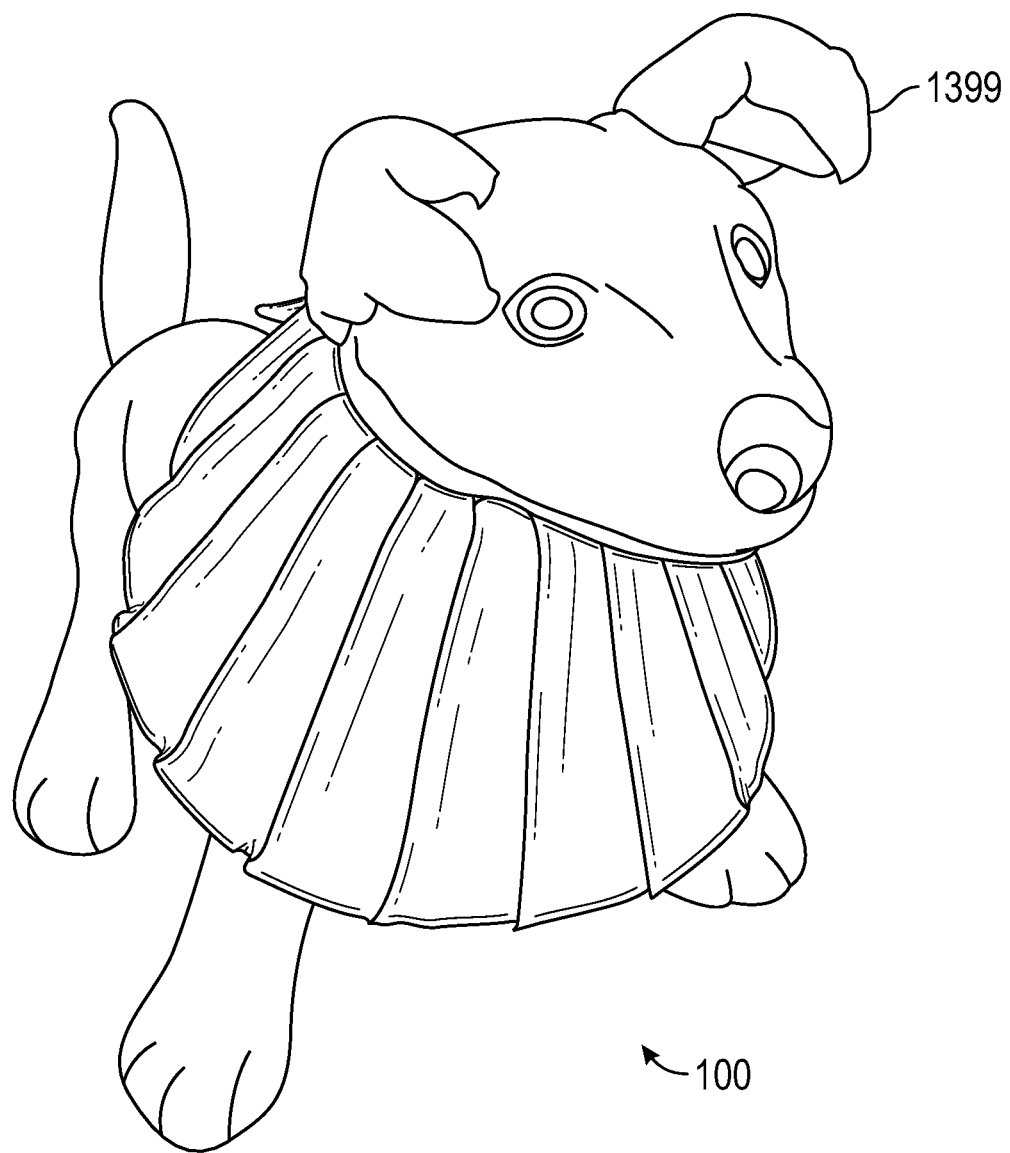
FIG. 14 may show the cone-collar of FIG. 1 in use, from a front right perspective view of a pet wearing this cone-collar flipped back in an inverted rear facing position.

FIG. 14 may show cone-collar 100 in use, from a front right perspective view of pet 1399 (animal 1399) wearing this cone-collar 100. FIG. 14 may show an alternative way for pet 1399 (animal 1399) to removably wear cone-collar 100 as compared to the positioning of cone-collar 100 shown in FIG. 13A through FIG. 13D. In FIG. 13A through FIG. 13D, cone-collar 100 may be oriented in a direction from integral-collar 103 to outer-greater-edge 107 that points from the neck of the pet 1399 (animal 1399) to an end of pet's 1399 (animal's 1399) head (e.g., towards the end of the snout). Whereas, in FIG. 14, the direction from integral-collar 103 to outer-greater-edge 107 may point towards a rear end of pet 1399 (animal 1399) (e.g., towards a tail end or towards hindlegs of) pet 1399 (animal 1399). In some embodiments, when cone-collar 100 may be properly worn by pet 1399 (animal 1399), the shortest portions of cone-collar 100 may be closest to (proximate to) the back neck of pet 1399 (animal 1399); whereas, the longest portions of cone-collar 100 may be closest to (proximate to) to a chest region of pet 1399 (animal 1399). In some embodiments, such positioning of cone-collar 100 on pet 1399 (animal 1399) may provide for protection upper body portions of pet 1399 (animal 1399), such as, but not limited to, chest region, front limbs, upper portions of front limbs, shoulders, and/or the like. See e.g., FIG. 14.

Such a given cone-collar 100 may also be used in other ways. If for example pet 1399 (animal 1399) had surgery on or around the eyes, ears or top of head or had some type of inflammation such as skin allergies which could cause scratching in one or more of these areas, then such areas may be protected from pet 1399 (animal 1399) scratching at them with either their front or rear paws merely by rotating cone-collar 100 such that the elongated portions with the tapered pocket(s) 105 may be positioned to protect such areas immediately adjacent. Then in some embodiments, cone-collar 100 may be removably secured in that position to harness 1301 to prevent rotation. Such a given cone-collar 100 may also be used in still other ways.

In some embodiments, cone-collars 100 may be produced (manufactured) in various predetermined sizes (e.g., different neck sizes). For example, and without limiting the scope of the present invention, cone-collars 100 may be available in about, 3 inch, 4 inch, 5 inch, and 6 inch neck diameter sizes; wherein "about" in this context may be plus or minus 0.25 of an inch. In other embodiments, other predetermined sizes may be available. In some embodiments, fasteners at the flaps (e.g., outer-flap 113 and inner-flap 115) may provide for some sizing adjustment. In some embodiments, fasteners at or proximate to the terminal ends of integral-collar 103 (e.g., first-terminal-end 117 and second-terminal-end 1217) may provide for some sizing adjustment.

In some embodiments, a given cone-collar 100 may be used by first unfastening fasteners at the flaps (e.g., outer-flap 113 and inner-flap 115); and unfastening fasteners at or proximate to the terminal ends (e.g., first-terminal-end 117 and second-terminal-end 1217) of integral-collar 103; and then re-fastening such respective fasteners such that the fastened flaps may now be at and/or touching a back of pet's 1399 (animal's 1399) neck. In some embodiments, this positioning of the given cone-collar 100 may be further secured by removably fastening integral-collar 103 to harness 1301, e.g., via use of one or more mechanical-fasteners 1303 to grommets 201. See e.g., FIG. 13B.

Figure 15:
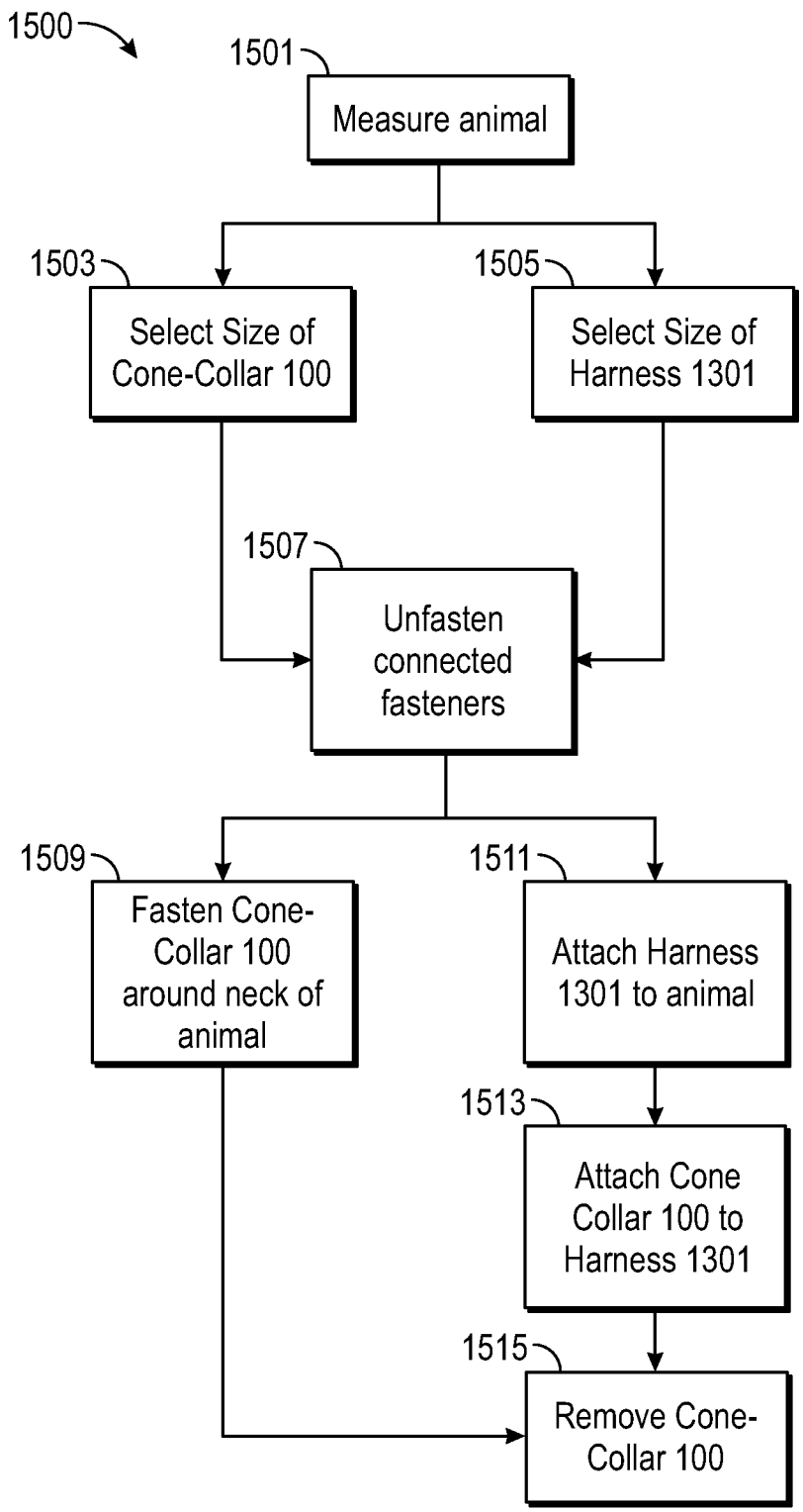
FIG. 15 may depict a flow diagram of steps in a method of using a given cone-collar.

FIG. 15 may depict a flow diagram of steps in a method 1500 of using a given cone-collar 100. In some embodiments there may a method of using a given cone-collar 100; wherein such methods may be designated as method 1500. In some embodiments, method 1500 may comprise at least one step selected from the following steps: 1501, 1503, 1505, 1507, 1509, 1511, 1513, and 1515. In some embodiments, one or more of these steps, except for at least one step 1509, may be optional steps. In some embodiments, step 1509 may be a mandatory step of method 1500.

Continuing discussing FIG. 15, in some embodiments, step 1501 may be a step of measuring pet 1399 (animal 1399). Step 1501 may be important so that a proper sized cone-collar 100 and/or a proper sized harness 1301 can be selected for use for that given pet 1399 (animal 1399). In some embodiments, step 1501 may comprise measuring a circumference of pet's 1399 (animal's 1399) neck and a circumference of a chest area just behind front legs. In some embodiments, step 1501 may comprise measuring a distance from a posterior ramus of a mandible (behind a jaw bone just below an ear) to a tip of a nose of that given pet 1399 (animal 1399). In some embodiments, step 1501 progress into step 1503; and/or into step 1505. See e.g., FIG. 15. In some embodiments, step 1501 may be optional. In some embodiments step 1501 may be unnecessary; e.g., when sizing may already be known.

Continuing discussing FIG. 15, in some embodiments, step 1503 may be a step of selecting a properly sized cone-collar 100 for pet 1399 (animal 1399) that may have been measured in step 1501. Use of the neck measurement from step 1501 may be used to select the correct sized of cone-collar 100. Use of the neck measurement along with the posterior jaw to nose measurement from step 1501 may be sued to select the proper size of cone-collar 100. In some embodiments, a sizing chart may be used for such correlations and sizing purposes. In some embodiments, step 1503 progress into step 1507. See e.g., FIG. 15. In some embodiments, step 1503 may be optional. In some embodiments step 1503 may be unnecessary; e.g., when sizing may already be known.

Continuing discussing FIG. 15, in some embodiments, step 1505 may be a step of selecting a properly sized harness 1301 for pet 1399 (animal 1399) that may have been measured in step 1501. Use of the chest measurement and/or the neck measurement from step 1501 may be used to select the correct size of harness 1301. In some embodiments, step 1505 progress into step 1507. See e.g., FIG. 15. In some embodiments, step 1505 may be optional. In some embodiments step 1505 may be unnecessary; e.g., when sizing may already be known.

Continuing discussing FIG. 15, in some embodiments, step 1507 may be a step of unfastening fasteners that without unfastening may block removable attachment to the given pet 1399 (animal 1399). In some embodiments, step 1507 may be a step of unfastening flap fasteners (e.g., outer-flap 113 and inner-flap 115) and/or unfastening integral-collar 103 fasteners at or proximate to the terminal ends (e.g., first-terminal-end 117 and second-terminal-end 1217). In some embodiments, step 1507 may be a step of unfastening a clip of harness 1301. In some embodiments, step 1507 progress into step 1509. In some embodiments, step 1507 progress into step 1511. See e.g., FIG. 15. In some embodiments, step 1507 may be optional. In some embodiments step 1507 may be unnecessary; e.g., when such fasteners may already be in the unfastened state.

Continuing discussing FIG. 15, in some embodiments, step 1509 may be a step of removably fastening the given cone-collar 100 around the neck of pet 1399 (animal 1399). In some embodiments, this may be accomplished by placing the unfastened cone-collar 100 around the pet's 1399 (animal's 1399) neck so that the longest extended portion of cone-like-structure 101 may be directly below the nose/mouth/snout; and then securing (removably fastening) the given cone-collar 100 about the neck using the adjustable fasteners (e.g., at the flaps [113 and 115] and/or at the terminal ends of integral-collar 103). Such removable fastening of the given cone-collar 100 to the neck may be snug but not tight. In some embodiments, step 1509 progress into step 1515. See e.g., FIG. 15. In some embodiments, step 1509 may be facilitated by first removing any preexisting collar that the given pet 1399 (animal 1399) may be wearing, to make room for integral-collar 103.

Continuing discussing FIG. 15, in some embodiments, step 1511 may be a step of removably attaching the given unfastened harness 1301 to pet 1399 (animal 1399). In some embodiments, step 1511 progress into step 1513. See e.g., FIG. 15. In some embodiments that do not use harness 1301 then step 1511 and/or step 1513 may be optional.

Continuing discussing FIG. 15, in some embodiments, step 1513 may be a step of removably attaching the given cone-collar 100 to the given harness 1301. In some embodiments, this removable attachment may be accomplished by use of one or more mechanical-fastener(s) 1303 to link harness 1301 to grommets 201 of integral-collar 103. In some embodiments, this may positionally fix cone-collar 100, such that fix cone-collar 100 may not rotate about the neck of pet 1399 (animal 1399). In some embodiments, removable attachment of the given cone-collar 100 to the given harness 1301 may make it more difficult or impossible for the pet 1399 (animal 1399) to remove cone-collar 100. In some embodiments, step 1513 progress into step 1515. See e.g., FIG. 15. In some embodiments that do not use harness 1301 then step 1511 and/or step 1513 may be optional.

Continuing discussing FIG. 15, in some embodiments, step 1515 may be a step of removing the given cone-collar 100. In some embodiments, step 1515 may be a step of removing cone-collar 100 from pet 1399 (animal 1399). In some embodiments, step 1515 may be a step of removing cone-collar 100 from harness 1301. In some embodiments, step 1515 may be a step of removing cone-collar 100 from harness 1301 and/or from pet 1399 (animal 1399). Such removal may be accomplished by unfastening the fasteners that were removably fastened in preceding steps; and then sliding and/or pulling cone-collar 100 over and off the head of pet 1399 (animal 1399). In some embodiments, step 1515 may be optional. In some embodiments, step 1515 may be unnecessary, e.g., when continued use may be desired.

In some embodiments, cone-like-structure 101 and/or one or more of its components may be substantially constructed from one or more types of fabrics, textiles, and/or canvas. In some embodiments, such fabrics, textiles, and/or canvas may be synthetic and/or natural. In some embodiments, such fabrics, textiles, and/or canvas may be substantially waterproof and/or coated with a substantially waterproof layer. In some embodiments, such fabrics, textiles, and/or canvas may be substantially windproof and/or coated with a substantially windproof layer. In some embodiments, such fabrics, textiles, and/or canvas may be substantially machine washable.

In some embodiments, integral-collar 103 and/or one or more of its components may be substantially constructed from one or more types of fabrics, textiles, and/or canvas. In some embodiments, such fabrics, textiles, and/or canvas may be synthetic and/or natural. In some embodiments, such fabrics, textiles, and/or canvas may be substantially waterproof and/or coated with a substantially waterproof layer. In some embodiments, such fabrics, textiles, and/or canvas may be substantially windproof and/or coated with a substantially windproof layer. In some embodiments, integral-collar 103 may be a woven member. In some embodiments, integral-collar 103 may be a substantially elongate and planar woven member. In some embodiments, integral-collar 103 may be substantially constructed from strapping. In some embodiments, integral-collar 103 may be substantially constructed from webbing.

In some embodiments, mechanical fasteners may be substantially constructed from one or more metals and/or plastics.

In some embodiments, grommets may be substantially constructed from one or more metals and/or plastics. In some embodiments, grommets may be substantially constructed from stitching.

In some embodiments, stitching may be substantially constructed from thread, either synthetic and/or natural. In some embodiments, stitching may be replaced or augmented with welding, adhesives, conventional fabric sealing means, and/or the like.

Note with respect to the materials of construction, it is not desired nor intended to thereby unnecessarily limit the present invention by reason of such disclosure.

Ergonomic protective cone collars for pets (also referred to as "cone-collars") have been described; as well uses thereof. The foregoing description of the various exemplary embodiments of the invention has been presented for the purposes of illustration and disclosure. It is not intended to be exhaustive or to limit the invention to the precise form disclosed. Many modifications and variations are possible in light of the above teaching without departing from the spirit of the invention.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

What is claimed is:

1. An ergonomic protective cone-collar to be removably worn around a neck of an animal, wherein the cone-collar comprises:
    a cone-like-structure that has a closed configuration and an open configuration; wherein when the cone-like-structure is in the closed configuration, the cone-like structure is substantially cone shaped, without a tip of a cone; wherein the cone-like-structure is of fixed but different lengths such that a longest length of the cone-like-structure is disposed between shorter lengths of the cone-like-structure; wherein when the cone-like-structure is in the closed configuration, an entirety of the cone shape of the cone-like-structure as viewed from a side of the cone-like-structure has the lengths of the cone-like-structure that substantially progresses from the shorter lengths to longer lengths; wherein the cone-like-structure is formed from a plurality of connected panels that are disposed between two flaps, an outer-flap and an inner-flap, respectively; wherein the outer-flap and the inner-flap are removably attachable to each other; wherein when the two flaps are removably attached to each other the cone-like-structure is in the closed configuration;
    an integral-collar that is an elongate, a flexible, and a planar member; wherein the integral-collar functions at least as a pet collar being removably worn around the neck of the animal when the cone-collar is being removably worn by the animal;
    wherein the cone-like-structure is attached to the integral-collar;
    wherein with respect to the closed configuration of the cone-like-structure, the plurality of connected panels are radially oriented with respect to an imaginary central axis running through a center of the integral-collar when the integral-collar is in the closed configuration;
    wherein each panel selected from the plurality of connected panels extends from an inner-lesser-edge to an outer-greater-edge; wherein the inner-lesser-edge is shorter in length than the outer-greater-edge; wherein the imaginary central axis is closer to the inner-lesser-edge than to the outer-greater-edge;
    wherein each panel selected from the plurality of connected panels is wider towards the outer-greater-edge and narrower towards the inner-lesser-edge; and
    wherein during use when the cone-collar is removably attached to the neck of the animal, the cone-like-structure is a physical barrier inhibiting an ability of the animal to bite, lick, or scratch a region of the animal's body.

2. The cone-collar according to claim 1, wherein the plurality of connected panels is a fixed number of such panels from nine to twenty-one panels.

3. The cone-collar according to claim 1, wherein the plurality of connected panels proximate to the outer-greater-edge are tapered.

4. The cone-collar according to claim 1, wherein at or proximate to the inner-lesser-edge, the cone-like-structure is attached to the integral-collar along a portion of a length of the integral-collar.

5. The cone-collar according to claim 1, wherein each panel selected from the plurality of connected panels is a pocket.

6. The cone-collar according to claim 5, wherein each pocket is substantially filled with a filler that provides at least some stiffness, at least some flexibility, and at least some elastic memory to each pocket.

7. The cone-collar according to claim 6, wherein the filler is one or more of: stuffing; batting; polyester fiber fill; fibers; strips; foam; expandable liquid foam;
    air in an air bladder; gas in a gas bladder; beads; flexible compressible beads; or sand.

8. The cone-collar according to claim 1, wherein the integral-collar has a substantially flat width, wherein at least portion of this substantially flat width is for removable physical contact with the neck of the animal to evenly distribute loads on the cone-like-structure to this substantially flat width.

9. The cone-collar according to claim 1, wherein the integral-collar has two opposing terminal ends that are removably attachable to each other to function as the pet collar.

10. The cone-collar according to claim 1, wherein the integral-collar has at least one hole passing entirely through a flat width of the integral-collar; wherein the at least one hole at least functions as a location for mechanical attachment.

11. The cone-collar according to claim 10, wherein the cone-collar comprises at least one linkage that is attached to at least one hole.

12. A system for inhibiting licking, biting, or scratching of a body region of an animal, the system comprising:
    a body harness, wherein the body harness is removably attachable to a cone-collar via at least one linkage, wherein the body harness is removably worn by the animal;
    the cone-collar to be removably worn around a neck of the animal, wherein the cone-collar comprises:
    a cone-like-structure that has a closed configuration and an open configuration; wherein when the cone-likestructure is in the closed configuration, the cone-like structure is substantially cone shaped, without a tip of a cone; wherein the cone-like-structure is of fixed but different lengths such that a longest length of the cone-like-structure is disposed between shorter lengths of the cone-like-structure; wherein when the cone-like-structure is in the closed configuration, an entirety of the cone shape of the cone-like-structure as viewed from a side of the cone-like-structure has the lengths of the cone-like-structure that substantially progresses from the shorter lengths to longer lengths; wherein the cone-like-structure is formed from a plurality of connected panels that are disposed between two flaps, an outer-flap and an inner-flap, respectively; wherein the outer-flap and the inner-flap are removably attachable to each other; wherein when the two flaps are removably attached to each other the cone-like-structure is in the closed configuration;

an integral-collar that is an elongate, a flexible, and a planar member; wherein the integral-collar functions at least as a pet collar being removably worn around the neck of the animal when the cone-collar is being removably worn by the animal;

wherein the cone-like-structure is attached to the integral-collar;

wherein with respect to the closed configuration of the cone-like-structure, the plurality of connected panels are radially oriented with respect to an imaginary central axis running through a center of the integral-collar when the integral-collar is in the closed configuration;

wherein each panel selected from the plurality of connected panels extends from an inner-lesser-edge to an outer-greater-edge; wherein the inner-lesser-edge is shorter in length than the outer-greater-edge; wherein the imaginary central axis is closer to the inner-lesser-edge than to the outer-greater-edge;

wherein each panel selected from the plurality of connected panels is wider towards the outer-greater-edge and narrower towards the inner-lesser-edge; and wherein during use when the cone-collar is removably attached to the neck of the animal, the cone-like-structure is a physical barrier inhibiting an ability of the animal to bite, lick, or scratch the body region of the animal.

13. The system according to claim 12, wherein the system further comprises the at least one linkage; wherein the at least one linkage is removably attached to at least one hole in the integral-collar.

14. The system according to claim 12, wherein the cone-collar is removably attachable to the body harness preventing rotation about the neck of the of animal of the cone-collar such that a longest length portion of the cone-like-structure is maintained below a nose of the animal; and such that shorter length portions of the cone-like structure are maintained proximate to eyes of the animal so as to not restrict vision of the animal.

15. An ergonomic protective cone-collar to be removably worn around a neck of an animal, wherein the cone-collar comprises:

a cone-like-structure that is substantially cone shaped, without a tip of a cone, when the cone-like-structure is in a closed configuration; wherein the cone-like-structure is formed from a plurality of connected panels; wherein each panel selected from the plurality of connected panels extends from an inner-lesser-edge to an outer-greater-edge; wherein the inner-lesser-edge is shorter in length than the outer-greater-edge; wherein each panel selected from the plurality of connected panels is wider towards the outer-greater-edge and narrower towards the inner-lesser-edge; wherein when the cone-like-structure is in the closed configuration, an entirety of the cone shape of the cone-like-structure as viewed from a side of the cone-like-structure has lengths of the cone-like-structure that substantially progresses from shorter to longer;

an integral-collar that is an elongate, a flexible, and a planar member; wherein the integral-collar functions at least as a pet collar being removably worn around the neck of the animal when the cone-collar is being removably worn by the animal;

wherein the cone-like-structure is attached to the integral-collar; and wherein during use when the cone-collar is removably attached to the neck of the animal, the cone-like-structure is a physical barrier inhibiting an ability of the animal to bite, lick, or scratch a region of the animal's body.

16. An ergonomic protective cone-collar to be removably worn around a neck of an animal, wherein the cone-collar comprises:

a cone-like-structure that has a closed configuration and an open configuration; wherein when the cone-like-structure is in the closed configuration, the cone-like structure is substantially cone shaped, without a tip of a cone; wherein the cone-like-structure is of fixed but different lengths such that a longest length of the cone-like-structure is disposed between shorter lengths of the cone-like-structure; wherein when the cone-like-structure is in the closed configuration, an entirety of the cone shape of the cone-like-structure as viewed from a side of the cone-like-structure has the lengths of the cone-like-structure that substantially progresses from the shorter lengths to longer lengths; wherein the cone-like-structure is formed from a plurality of connected panels that are disposed between two flaps, an outer-flap and an inner-flap, respectively; wherein the outer-flap and the inner-flap are removably attachable to each other; wherein when the two flaps are removably attached to each other the cone-like-structure is in the closed configuration;

an integral-collar that is an elongate, a flexible, and a planar member; wherein the integral-collar functions at least as a pet collar being removably worn around the neck of the animal when the cone-collar is being removably worn by the animal;

wherein the cone-like-structure is attached to the integral-collar;

wherein with respect to the closed configuration of the cone-like-structure, the plurality of connected panels are radially oriented with respect to an imaginary central axis running through a center of the integral-collar when the integral-collar is in the closed configuration;

wherein each panel selected from the plurality of connected panels extends from an inner-lesser-edge to an outer-greater-edge; wherein the inner-lesser-edge is shorter in length than the outer-greater-edge; wherein the imaginary central axis is closer to the inner-lesser-edge than to the outer-greater-edge;

wherein the shortest lengths are at the two flaps, wherein the longest length is of at least one panel selected from the plurality of connected panels that is substantially equal distant from each of the two flaps, wherein the at least one panel is a longest-panel; and wherein during use when the cone-collar is removably attached to the neck of the animal, the cone-like-structure is a physical barrier inhibiting an ability of the animal to bite, lick, or scratch a region of the animal's body.

17. The cone-collar according to claim 16, wherein when the cone-collar is being removably worn around the neck of the animal, the longest-panel is arranged below a nose of the animal and shorter panels selected from the plurality of connected panels are proximate to eyes of the animal so as to not restrict vision of the animal.

\* \* \* \* \*